(12) United States Patent
Ito et al.

(10) Patent No.: US 12,045,403 B2
(45) Date of Patent: Jul. 23, 2024

(54) OPERATION KNOB APPARATUS

(71) Applicant: U-Shin Ltd., Nagano (JP)

(72) Inventors: Kenji Ito, Hiroshima (JP); Akira Nagoshi, Hiroshima (JP)

(73) Assignee: U-SHIN LTD., Nagano (JP)

( * ) Notice: Subject to any disclaimer, the term of this patent is extended or adjusted under 35 U.S.C. 154(b) by 0 days.

(21) Appl. No.: 17/910,241

(22) PCT Filed: Feb. 18, 2021

(86) PCT No.: PCT/JP2021/006138
§ 371 (c)(1),
(2) Date: Sep. 8, 2022

(87) PCT Pub. No.: WO2021/199766
PCT Pub. Date: Oct. 7, 2021

(65) Prior Publication Data
US 2023/0115511 A1 Apr. 13, 2023

(30) Foreign Application Priority Data

Mar. 30, 2020 (JP) ................................ 2020-059301

(51) Int. Cl.
*G06F 3/0362* (2013.01)
*G05G 1/01* (2008.04)
(Continued)

(52) U.S. Cl.
CPC ............. *G06F 3/0362* (2013.01); *G05G 1/01* (2013.01); *G05G 1/02* (2013.01); *G05G 1/10* (2013.01); *G05G 23/00* (2013.01); *G06F 3/0393* (2019.05)

(58) Field of Classification Search
CPC ....... G06F 3/0362; G06F 3/0393; G05G 1/01; G05G 1/02; G05G 1/10; G05G 23/00
See application file for complete search history.

(56) References Cited

U.S. PATENT DOCUMENTS

2016/0176292 A1\* 6/2016 Blaesing ............... G06F 3/0412
335/219
2017/0052617 A1\* 2/2017 Okuzumi .............. G06F 3/0362
(Continued)

FOREIGN PATENT DOCUMENTS

| JP | 2014-182718 | 9/2014 |
|---|---|---|
| WO | 2015/174092 | 11/2015 |
| WO | 2019/087608 | 5/2019 |

OTHER PUBLICATIONS

International Search Report dated Apr. 27, 2021 in corresponding International Application No. PCT/JP2021/006138.

*Primary Examiner* — Kenneth B Lee, Jr.
(74) *Attorney, Agent, or Firm* — Wenderoth, Lind & Ponack, L.L.P.

(57) ABSTRACT

An operation knob apparatus includes a base a conductive transmitting member, an operation member that brings the transmitting member near to and away from a display panel, and a stabilizer disposed between the bases and the operation member. The stabilizer includes a main body, a pair of arms connected to respective ends of the main body, and a pair of base portions and connected to the respective arms. One of the base and the operation member has a holding portion configured to rotatably hold the main body, and the other has a pair of holding grooves respectively configured to slidably and rotatably hold the base portions.

8 Claims, 17 Drawing Sheets

(51) Int. Cl.
*G05G 1/02* (2006.01)
*G05G 1/10* (2006.01)
*G05G 23/00* (2006.01)
*G06F 3/039* (2013.01)

(56) References Cited

U.S. PATENT DOCUMENTS

| | | |
|---|---|---|
| 2018/0154774 A1* | 6/2018 | Park .................... G06F 3/04847 |
| 2020/0176202 A1 | 6/2020 | Yoshihara |
| 2020/0278761 A1* | 9/2020 | Takaoka ................ G06F 3/0338 |

* cited by examiner

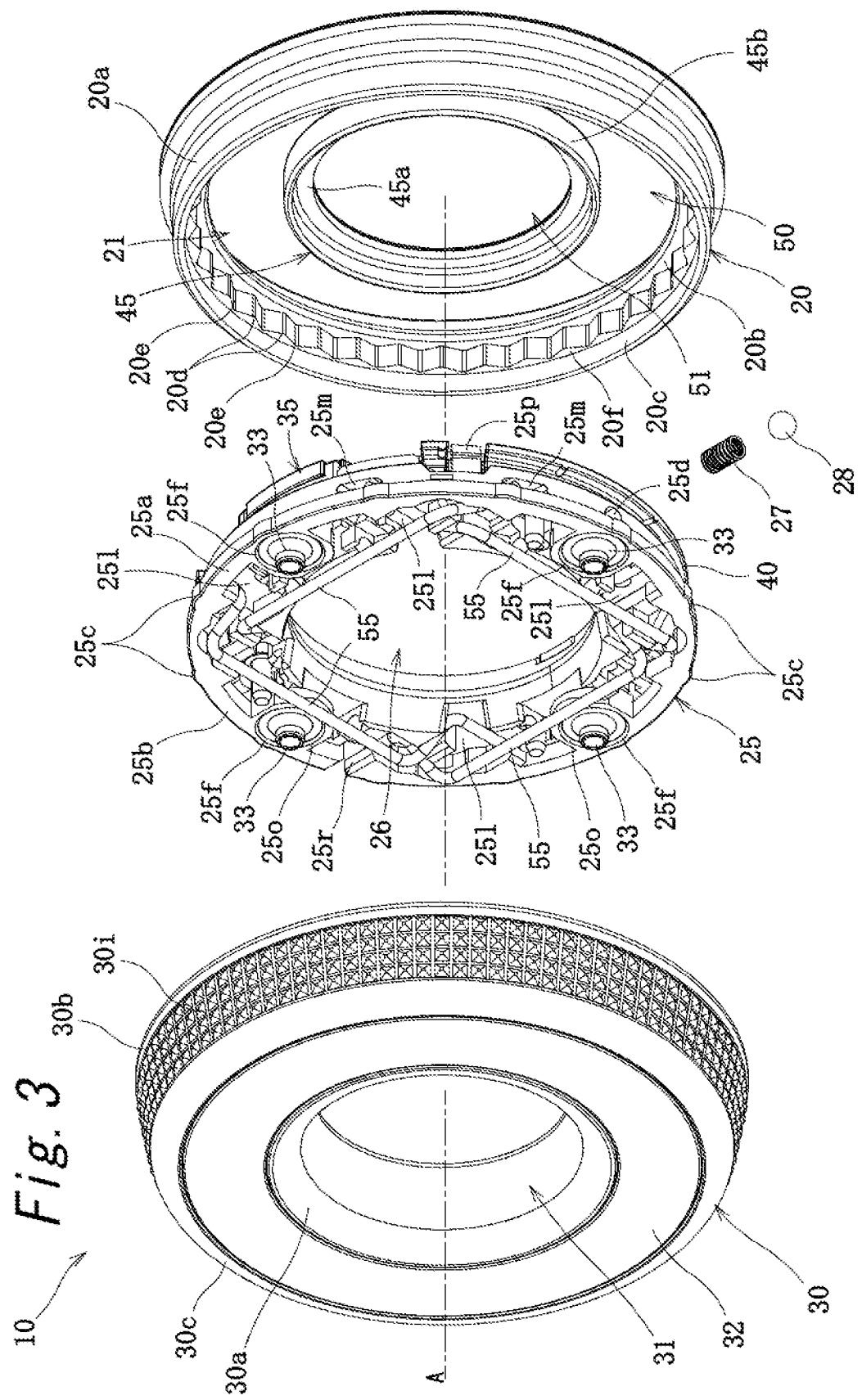

OPERATION KNOB APPARATUS

CROSS-REFERENCE TO RELATED APPLICATIONS

This is a national phase application in the United States of International Patent Application No. PCT/JP2021/006138 with an international filing date of Feb. 28, 2021, which claims priority of Japanese Patent Application No. 2020-059301 filed on Mar. 30, 2020 the contents of which are incorporated herein by reference.

TECHNICAL FIELD

The present invention relates to an operation knob apparatus.

BACKGROUND ART

On an in-vehicle product, such as a navigation apparatus or a center display, a display panel with a capacitive touch detection function is mounted. To make an operation on such an in-vehicle product, it is necessary to put a finger in a predetermined operation area on a display panel having no humps or dents. Therefore, the user needs to visually check the position of the operation area.

WO 2015/174092 A discloses an operation knob apparatus disposed on a surface of a display panel. The operation knob apparatus includes a base fixed to the display panel, a press button, and a rotary knob. The display panel can detect a pressing operation of the button by detecting a change in the electrostatic capacitance of the display panel, the change taking place as a transmitting member inside the button approaches the display panel. The display panel can detect a rotating operation of the knob as the transmitting member inside the knob moves the position of the electrostatic capacitance change. Because the operation knob apparatus protrudes from the display panel, the user can operate the in-vehicle product without looking at the display panel.

In the operation knob apparatus according to WO 2015/174092 A, because no consideration is given to the stability of the posture of the operation member, when the user presses an unbalanced position on the outer circumference of the button, the button becomes tilted with respect to the base. In such a case, because the transmitting member is not brought into surface contact with the display panel, the transmissibility of the operation may drop and the display panel may fail to detect the button pressing operation.

An object of the present invention is to provide an operation knob apparatus capable of improving the stability of the posture of an operation member, so that the operation can be better transmitted to a display panel.

SUMMARY OF THE INVENTION

An aspect of the present invention provides an operation knob apparatus comprising: a base having a first surface that faces a display panel and a second surface positioned on an opposite side of the display panel with respect to the first surface; a transmitting member being conductive and disposed on the first surface of the base; an operation member disposed on the second surface in a manner relatively movably with respect to the base in a direction intersecting with the first surface, and brings the transmitting member near to and away from the display panel; and a stabilizer disposed between the base and the operation member, wherein the stabilizer includes a main body, a pair of arms that are connected to respective ends of the main body and both of which protrude in a same direction from the main body, and a pair of base portions that are respectively connected to the pair of arms, and that protrude in directions separating from the arms, one of the base and the operation member includes a holding portion configured to rotatably hold the main body, and the other of the base and the operation member has a pair of holding grooves configured to hold the base portions slidably along the second surface and rotatably.

According to the present aspect, because the stabilizers are disposed between the base and the operation member, the tilting of the operation member with respect to the base can be suppressed when the pressing operation is made, and the stability of the posture of the operation member can be improved. Therefore, the user operability of the operation member can be improved. In addition, the transmitting member that moves in association with the movement of the operation member can be brought into surface contact with the display panel. Therefore, because the operation of the operation member can be reliably transmitted to the display panel, the detection performance of the display panel can be improved.

EFFECT OF THE INVENTION

With the operation knob apparatus according to the present invention, it is possible to improve the stability of the posture of the operation member, so that the operation can be better transmitted to the display panel.

BRIEF DESCRIPTION OF THE DRAWINGS

FIG. 3 is an exploded perspective view of the operation knob apparatus;

DESCRIPTION OF EMBODIMENTS

An embodiment of the present invention will now be explained with reference to some drawings.

Figure 1:
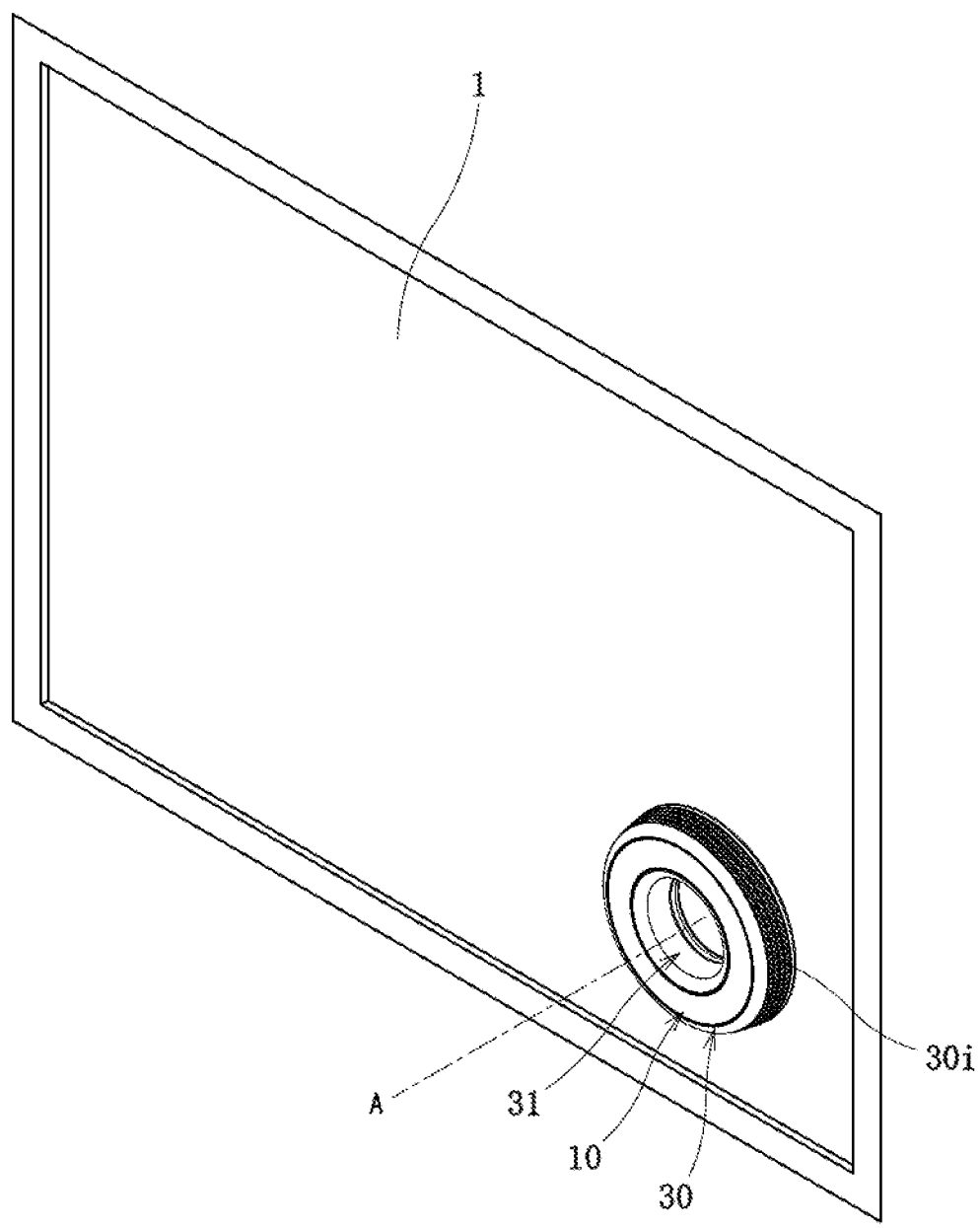
FIG. 1 is a perspective view of a display panel on which an operation knob apparatus according to an embodiment of the present invention is disposed.
Figure 2A:
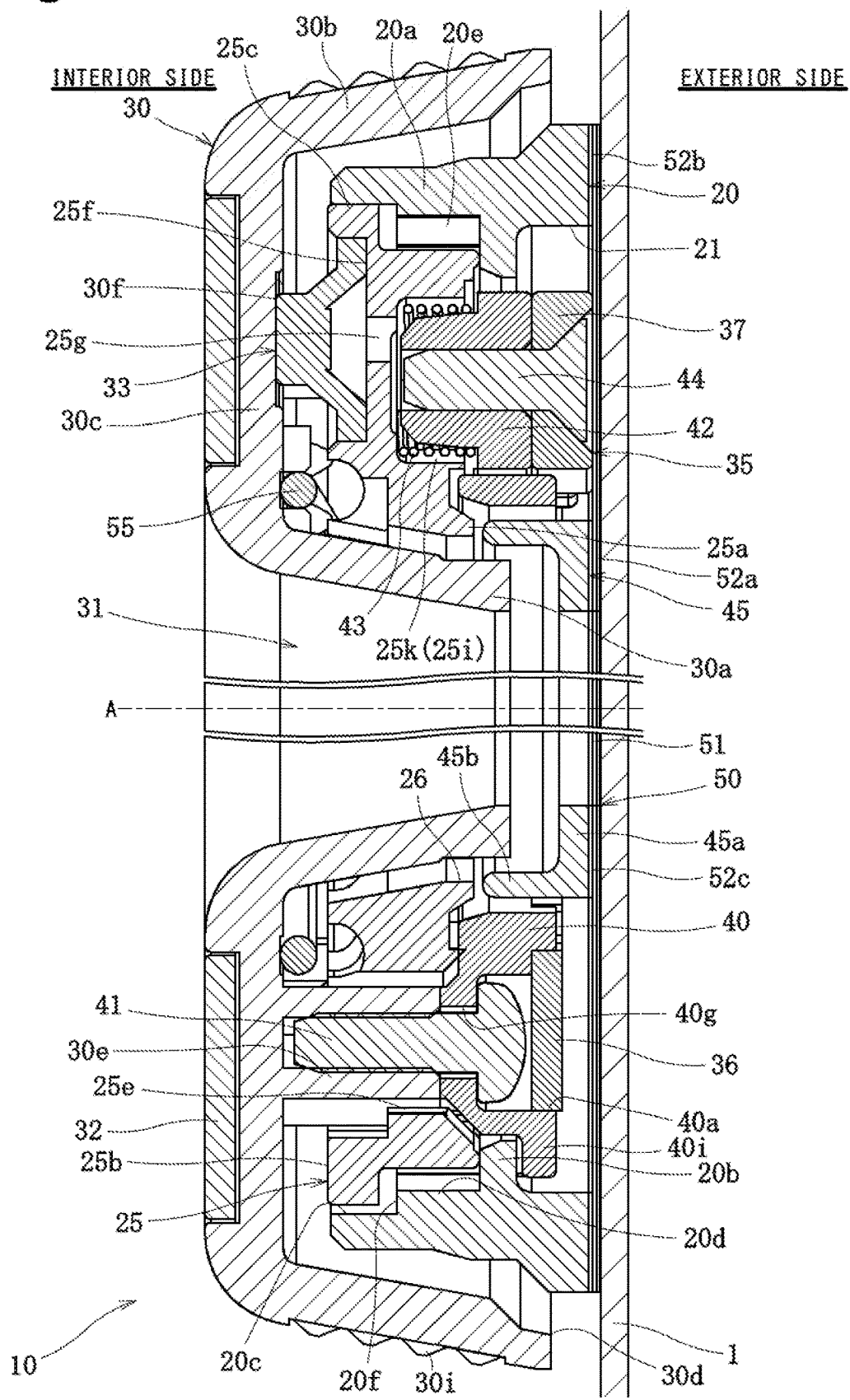
FIG. 2A is a cross-sectional view of the operation knob apparatus illustrated in FIG. 1.

FIGS. 1 and 2A illustrate an operation knob apparatus 10 according to an embodiment of the present invention. A display panel 1 on which operation knob apparatus 10 is disposed has a touch detecting function for detecting a user's operation through a change in the electrostatic capacitance, and is mounted on an in-vehicle product, such as a navigation device or a center display.

As illustrated in FIG. 1, the operation knob apparatus 10 is disposed in a predetermined operation area of the display panel 1, and protrudes from display panel 1 toward the interior side of the vehicle. The operation knob apparatus 10 has an annular shape as a whole, and is disposed in such a manner that an axis A extends in the direction orthogonal to the display panel 1 that is disposed in a manner extending vertically. The operation knob apparatus 10 includes one knob (operation member) 30, and transmits a pressing operation and a rotating operation performed on the knob 30 to the display panel 1.

As illustrated in FIGS. 2A and 3, the operation knob apparatus 10 includes a holder 20, a rotor 25, the knob 30, a biasing member 33, a transmitting member 35, a ring member 45, and a film 50. Among these elements, the holder 20 and the rotor 25 serve as a base of the operation knob apparatus 10. The operation knob apparatus 10 is fixed on a surface of the display panel 1 via the film 50 including an adhesive layer 52a. The transmitting member 35 according to the present embodiment includes a first transmitting member 36 that transmits a pressing operation of the knob 30, and a second transmitting member 37 that transmits a rotating operation of the knob 30.

The holder 20 and the ring member 45 are fixed to the film 50, in a manner coming adjacently to the display panel 1. The rotor 25 is disposed in the holder 20 in a rotatable manner about the axis A. The knob 30 is attached to the rotor 25 linearly movably in a direction along the axis A, and is rotated integrally with the rotor 25, about the axis A. The biasing member 33 is disposed between the rotor 25 and the knob 30, and applies a biasing force to the knob 30 in a direction separating from display panel 1. The first transmitting member 36 is attached to the knob 30, and moves along the axis A in a manner associated with a linear movement of the knob 30. The second transmitting member 37 is attached to the rotor 25, and rotates integrally with the rotor 25.

Figure 2B:
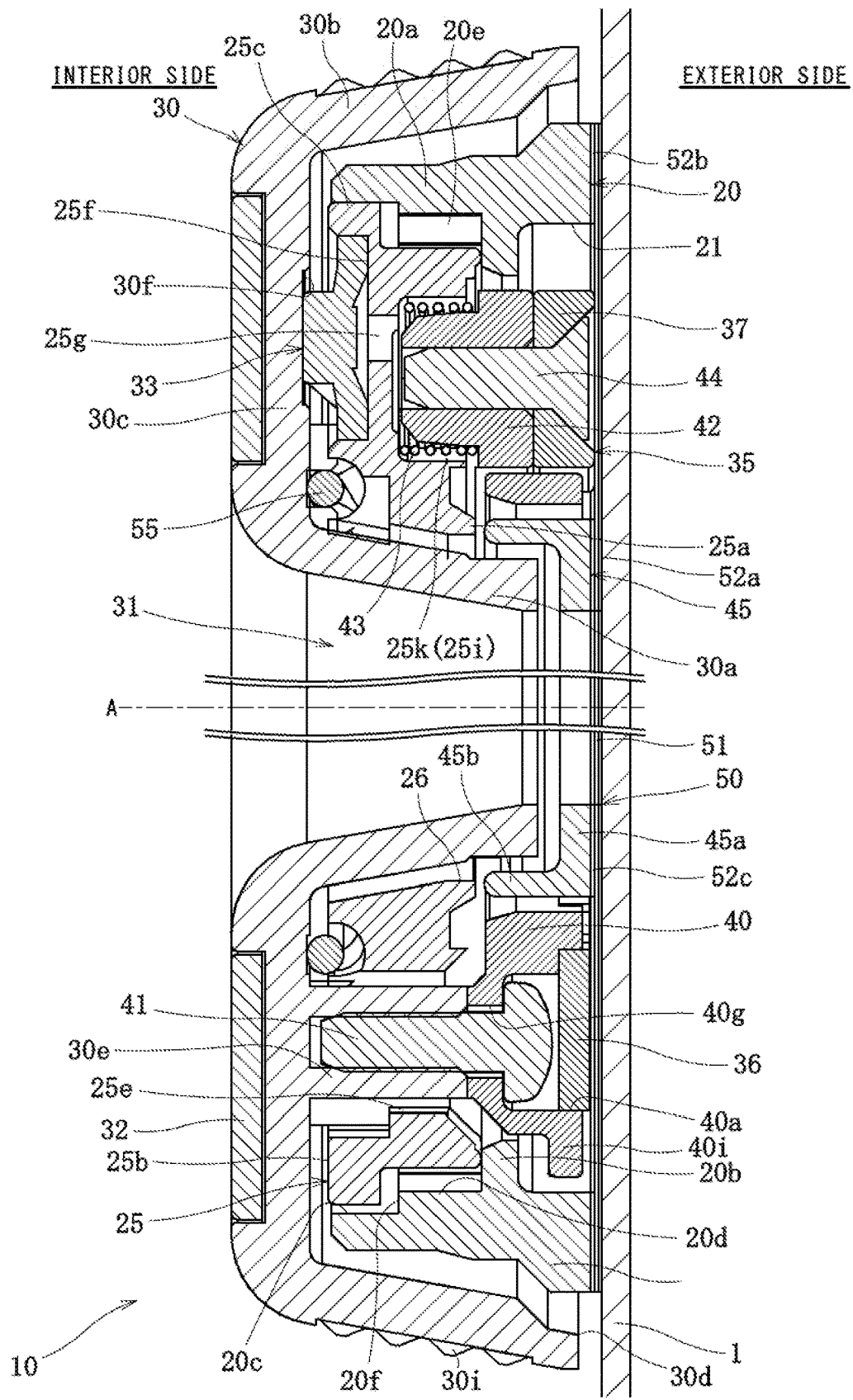
FIG. 2B is a cross-sectional view of the operation knob apparatus having been pressed.

As illustrated in FIG. 2B, when the knob 30 is pressed toward the display panel 1, the first transmitting member 36 moves linearly and integrally toward the film 50. The display panel 1 can detect a pressing operation of the knob 30 by a change in the electrostatic capacitance caused by the conductive first transmitting member 36 approaching thereto. When the hand is released from the knob 30, the biasing members 33 move (separate) the knob 30 and the first transmitting member 36 in a direction separating from the display panel 1. The display panel 1 can detect the release of a pressing operation by the disappearance of the change in the electrostatic capacitance caused by the first transmitting member 36. With a pressing operation of the knob 30, the second transmitting member 37 is held near the display panel 1, and the area of the display panel 1 where the second transmitting member 37 has caused a change in the electrostatic capacitance remains unchanged (unmoved).

When the knob 30 is operated to be rotated from the position in FIG. 2A, the rotor 25 and the second transmitting member 37 are integrally rotated in the same direction as that in which the knob 30 is rotated. The display panel 1 can detect a rotating operation of the knob 30 as a movement (rotation) of the position where the electrostatic capacitance has changed, the movement (rotation) resultant of the rotation of the second transmitting member 37 that is conductive. When the rotating operation stops, the rotation of the rotor 25 and the second transmitting member 37 also stops. The display panel 1 can detect the stop in the rotating operation as a stop in the position where the electrostatic capacitance has changed. By detecting a stop in the position where the electrostatic capacitance has changed, the display panel 1 can detect that the function intended by the user is to be executed, is to be stopped, or the amount by which an adjustment is to be made. In the rotating operation of the knob 30, although the first transmitting member 36 is rotated integrally, but the first transmitting member 36 does not cause a change in the electrostatic capacitance of the display panel 1 because the first transmitting member 36 remains separated from the display panel 1.

In such an operation knob apparatus 10, in the present embodiment, a plurality of (four in the present embodiment) stabilizers 55 are disposed between the rotor 25 and the knob 30 to suppress tilting of the knob 30 with respect to the rotor 25. In other words, by improving the stability the posture of the knob 30 using stabilizers 55, the operation transmissibility to the display panel 1, namely, the detecting performance of the display panel 1 is improved.

Elements included in the operation knob apparatus 10 will now be explained specifically. In the following description, the side of the film 50 that is near the display panel 1 is sometimes referred to as an exterior side, and the side of the furthest end wall 30c of the knob 30, being furthest from the display panel 1, is sometimes referred to as an interior side.

Figure 4:
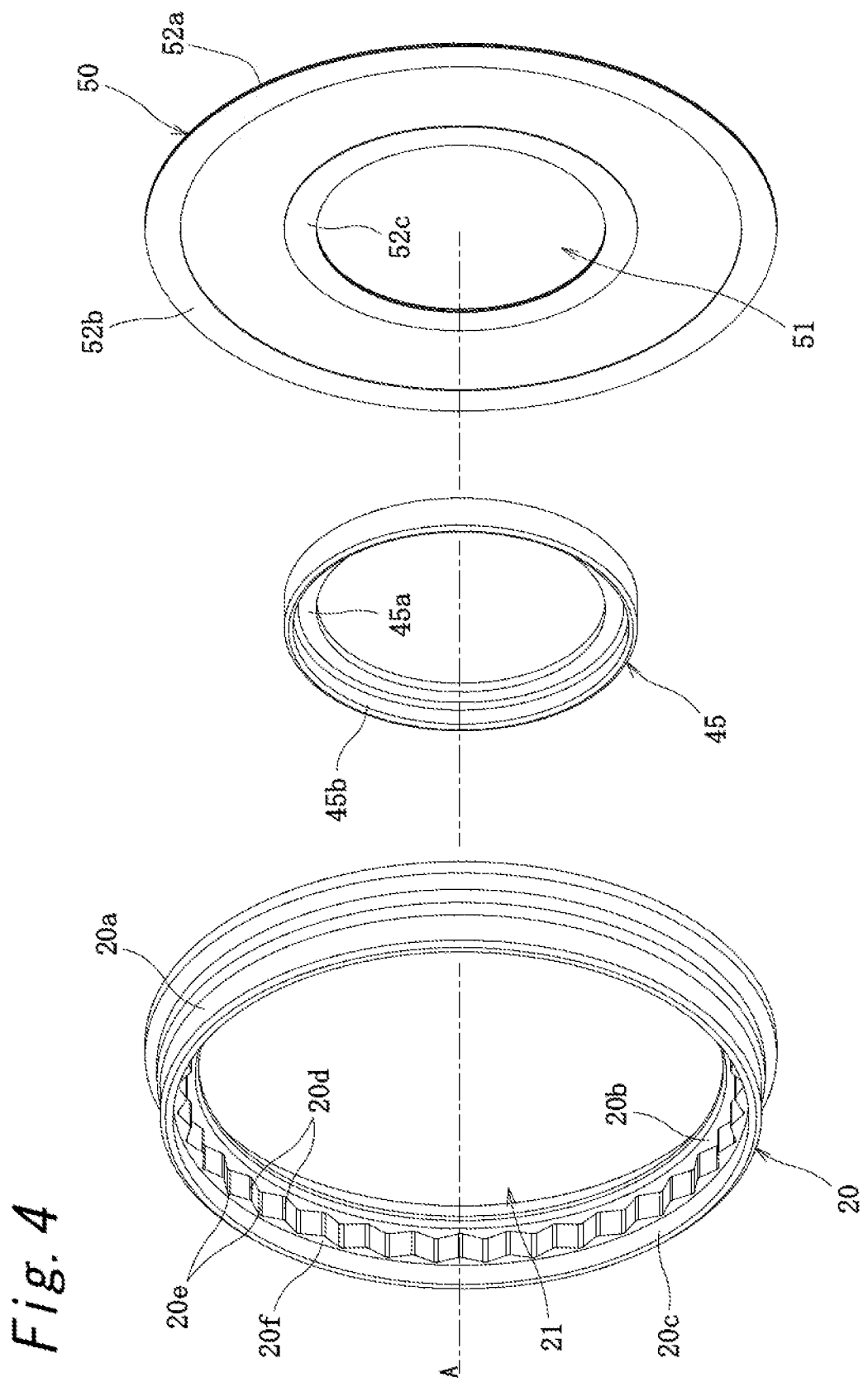
FIG. 4 is an exploded perspective view of the holder, the ring member, and the film illustrated in FIG. 3.

As illustrated in FIGS. 3 and 4, the holder 20 is fixed to the outer circumference of the film 50, and holds the other components onto the display panel 1. The holder 20 is made of an insulating (that is, not conductive) resin (such as ABS). The holder 20 includes a cylindrical main body 20a that defines an opening (internal space) 21 through which a part of the display panel 1 is exposed. The holder 20 is disposed on the display panel 1 in such a manner that the axis A of the main body 20a extends in the direction orthogonal to the display panel 1.

Referring to FIGS. 2A and 3, holding portions 20b and 20c for holding the rotor 25 are provided on the inner circumferential surface of the main body 20a. The first holding portion 20b is provided on the exterior side of the main body 20a, and the second holding portion 20c is provided near an end of the main body 20a on the interior side. The first holding portion 20b protrudes radially inwards from the main body 20a in a manner delineating an annular shape, holds the outer circumference of the rotor 25 rotatably, and restricts the movement of the rotor 25 along the axis A toward the exterior side. The second holding portion 20c forms a part of the inner circumferential surface of the main body 20a, rotatably holds a sliding contact portion 25c of the rotor 25, which will be described later, and restricts radial movements of the rotor 25.

A plurality of triangular prism-shaped protrusions 20d protruding inwards in the radial direction are disposed between the first holding portion 20b and the second holding portion 20c, along the circumferential direction, on the inner circumference of the holder 20. Between the adjacent protrusions 20d in the circumferential direction, engagement grooves 20e for becoming engaged with an engaging member 28, which will be described later, are provided, respectively. Ends of the protrusions 20d on the interior side are positioned on the exterior side with respect to the end of the holder 20 on the interior side, and together provide an abutting portion 20f.

Figure 5:
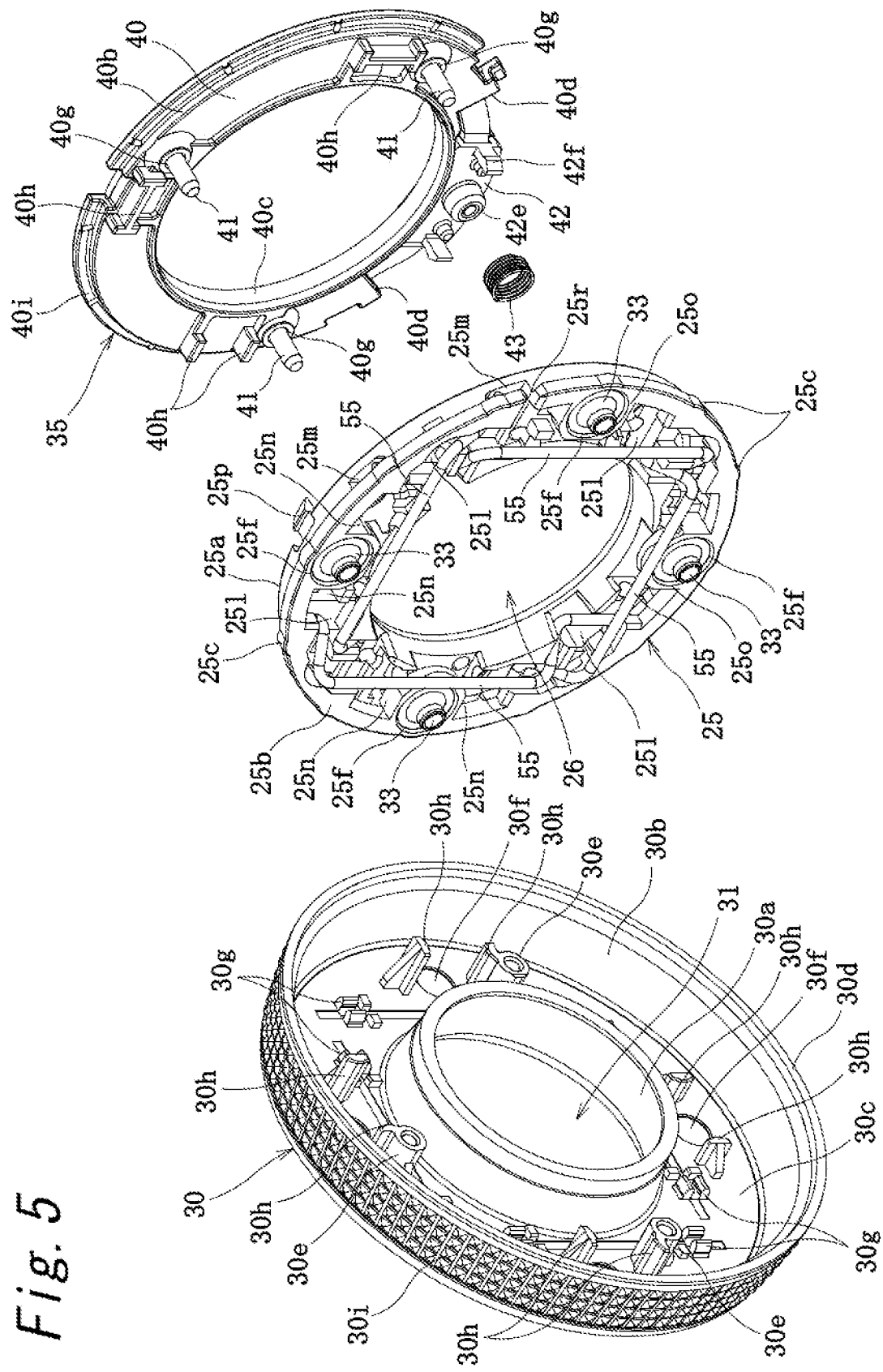
FIG. 5 is an exploded perspective view of the rotor, the transmitting member, and the knob illustrated in FIG. 3.

As illustrated in FIGS. 3 and 5, the rotor 25 has an opening (internal space) 26 that communicates with the opening 21. The rotor 25 is an annular plate disposed inside of (internally fitted into) the holder 20, with their center at the axis A, and is made of an insulating resin (for example, PBT). Referring to FIG. 2A, the rotor 25 has a first surface 25a disposed on the exterior side and facing the film 50 (display panel 1), and a second surface 25b disposed on the interior side and positioned on the opposite side of the film 50. When the rotor 25 is disposed inside the holder 20, the first surface 25a is brought into abutment against the first holding portion 20b, and the second surface 25b is aligned flat with the end of the holder 20 on the interior side. Referring to FIG. 3, a locking piece 25p to be locked with a surface of the first holding portion 20b on the exterior side is provided on the outer circumference of the rotor 25.

The outer diameter of the rotor 25 is larger than the inner diameter of the first holding portion 20b, and smaller than the diameter of a virtual circle (not illustrated) connecting the tips of the protrusions 20d. Provided on an end of the rotor 25 on the side of the second surface 25b are sliding contact portions 25c that are brought into sliding contact with the second holding portion 20c. The sliding contact portions 26e protrude radially outwards, and are placed on the abutting portion 20f of the holder 20. The sliding contact portions 25c include a plurality of arc-shaped protrusions protruding with some space therebetween in the circumferential direction. The diameter of an imaginary circle (not illustrated) connecting the outer ends of these protrusions is larger than the diameter of the imaginary circle connecting the tips of the protrusions 20d, and is smaller than the inner diameter of the second holding portion 20c. With this configuration, the rotor 25 can be rotated about the axis A inside the holder 20.

As illustrated in FIG. 3, an attachment hole 25d that is a space recessed radially inwards and having a circular cross section is provided on the outer circumference of the rotor 25. A spring 27 and a spherical engaging member 28 are disposed inside the attachment hole 25d. The diameter of the engaging member 28 is smaller than the diameter of the attachment hole 25d and larger than the groove depth of the engagement grooves 20e in the radial direction. When the rotor 25 is rotated with respect to the holder 20, the inclined surface of the protrusion 20d carries the engaging member 28 into the attachment hole 25d, and causes the spring 27 to be compressed thereby. When the engaging member 28 to which the spring 27 is applying an outward biasing force becomes engaged with the engagement groove 20e, the rotor 25 remains at a predetermined rotational angular position with respect to the holder 20.

Figure 6:
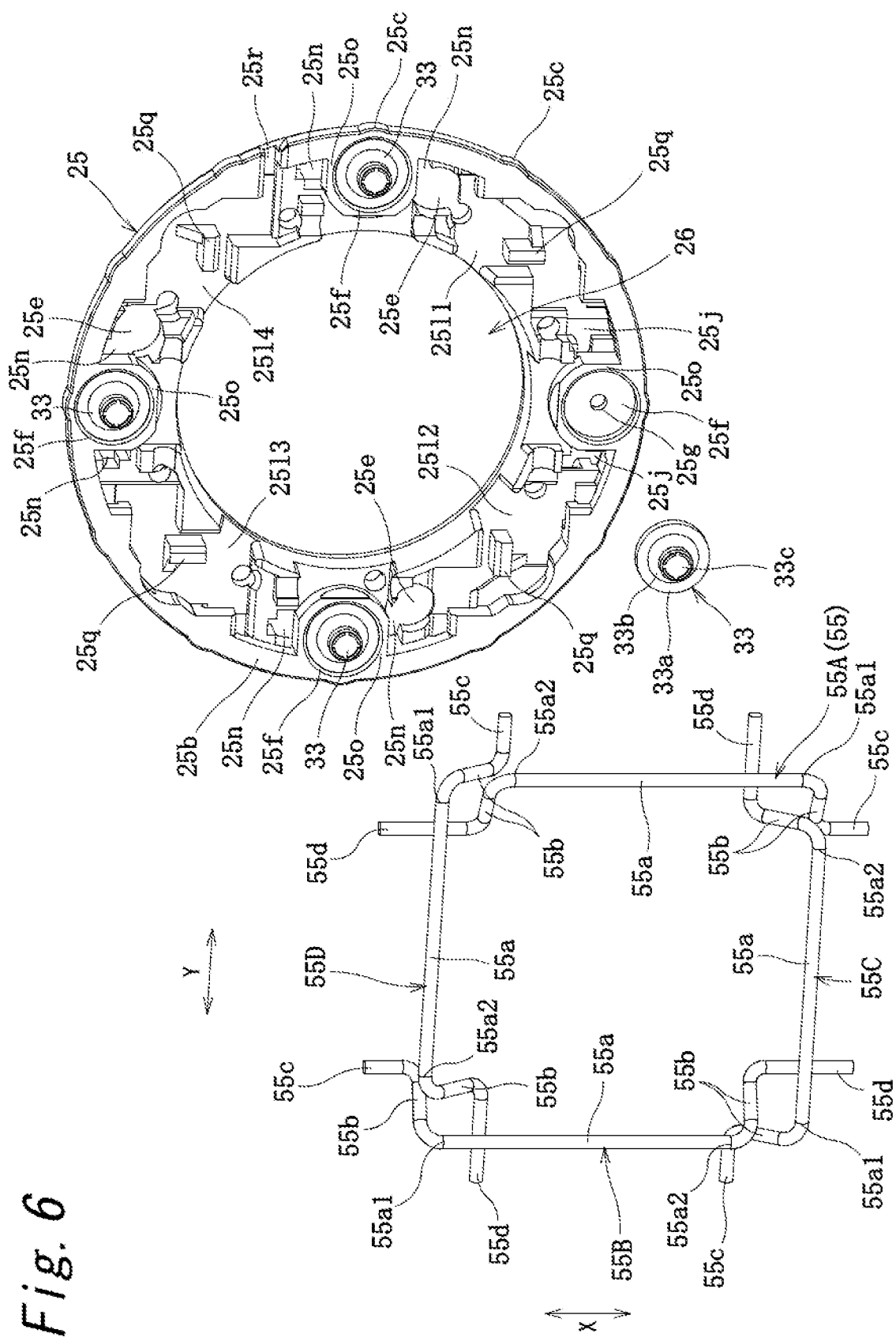
FIG. 6 is an exploded perspective view of a rotor, a biasing member, and a stabilizer.
Figure 7:
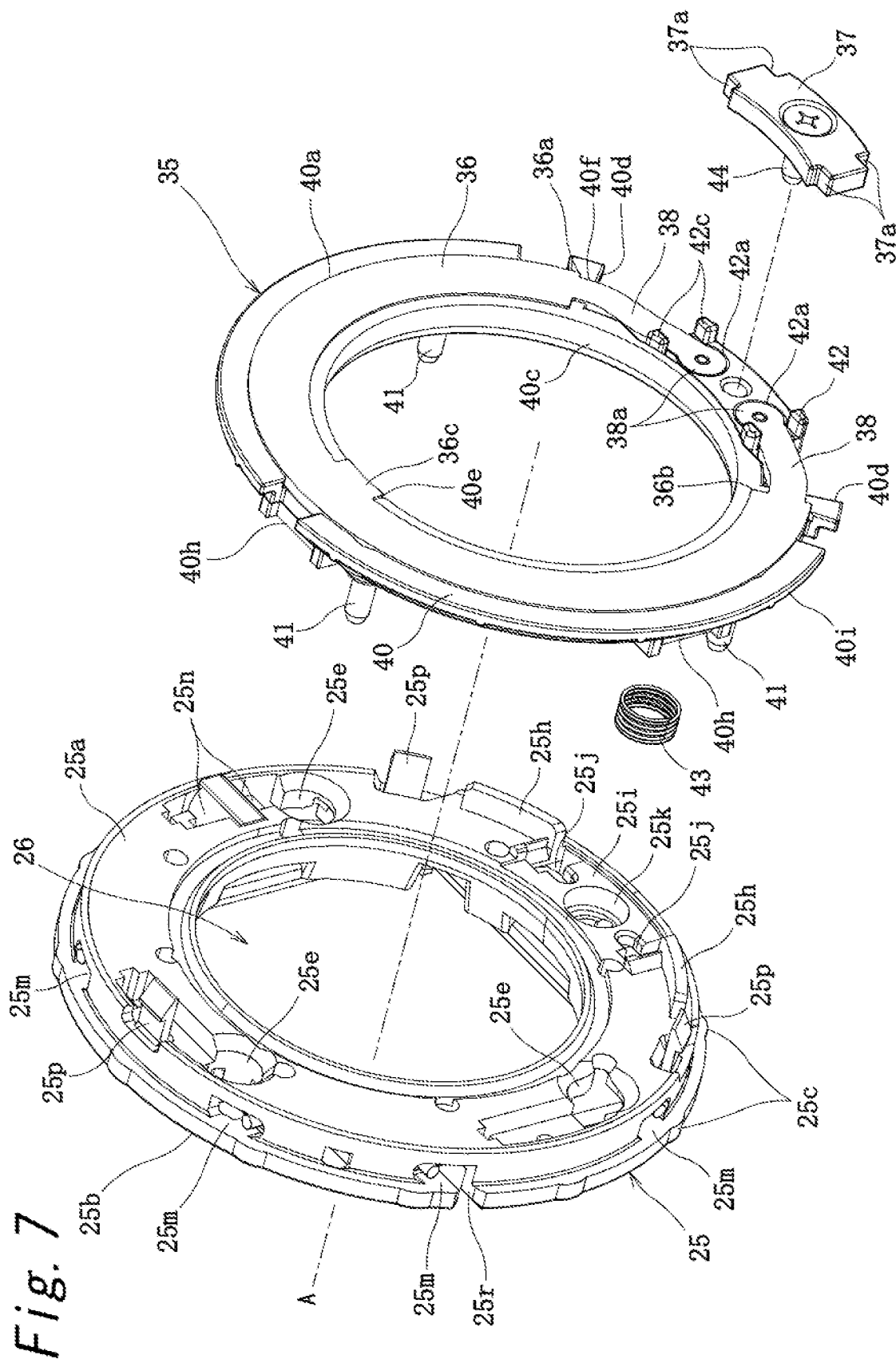
FIG. 7 is an exploded perspective view of the rotor, the first transmitting member, and a second transmitting member, as viewed from the side of the display panel.

Referring to FIG. 2A, the rotor 25 is provided with insertion holes 25e for allowing the knob 30 to be moved along the axis A. Referring to FIG. 6, seats 25f where biasing members 33 are disposed, respectively, and recesses 25l where the stabilizers 55, which will be described later, are disposed, respectively, are provided on the second surface 25b of the rotor 25. Referring to FIG. 7, guide ribs 25h for supporting holding member 42 and an attachment portion 25i for attaching the holding member 42 (second transmitting member 37) are provided on the first surface 25a of the rotor 25. These elements will be described later in detail.

As illustrated in FIGS. 3 and 5, the knob 30 is an annular body with an opening 31 communicating with the opening 21, and permitting a part of display panel 1 to be visually recognized. The knob 30 is an annular cover having a center at the axis A, and is made of an insulating resin (e.g., PC/ABS). The knob 30 is disposed on the second surface 25b of the rotor 25 relatively movably in a direction along the axis A with respect to the rotor 25, that is, in a direction orthogonal to the first surface 25a, but in such a manner that a relative movement in a circumferential direction around the axis A with respect to the rotor 25 is restricted.

Specifically, as illustrated in FIGS. 2A and 5, the knob 30 includes a conical tubular inner wall 30a that defines the opening 31, and a conical tubular outer wall 30b that surrounds the outside of the inner wall 30a. The inner wall 30a is disposed inside the ring member 45 in a manner positioned on the innermost side. The outer wall 30b is disposed outside of the holder 20 in a manner positioned on the outermost side. These walls have concentric tubular shapes with their center at the axis A. An outer surface of the outer wall 30h is provided with an anti-slip 30i for preventing slippage during a rotating operation. The anti-slip 30i includes a large number of bumps and dents formed by surface processing.

Interior-side ends of the inner wall 30a and the outer wall 30b are closed by an end wall 30c that is continuous thereto. Exterior-side ends of the inner wall 30a and the outer wall 30b form an open portion 30d that is open. In other words, the end wall 30c connected to the outer wall 30b has an opening 31 through which a part of display panel 1 can be visually recognized through the opening 21, and the inner wall 30a is provided continuously to the rim of the opening 31. In the present embodiment, an annular decorative plate 32 is disposed on the outer surface of the end wall 30c.

The inner wall 30a and the outer wall 30b are inclined in a direction separating from each other, as these walls extend from the end wall 30c toward the open portion 30d. The diameter across the outer end of the inner wall 30a on the side of the open portion 30d is smaller than the inner diameter of the ring member 45, and the outer end of the inner wall 30a protrudes further toward the exterior side than the rotor 25. The diameter across the outer end of the outer wall 30b on the side of the open portion 30d is larger than the outer diameter of the holder 20, and the outer end of the outer wall 30b protrudes further toward the exterior side than the rotor 25. The rotor 25 and a large portion of the holder 20 are housed inside the inner wall 30a, the outer wall 30b, and the end wall 30c.

With continued reference to FIGS. 2A and 5, the end wall 30c is provided with cylindrical bosses (coupling portions) 30e passed through the rotor 25 and protruding on the side of the open portion 30d (exterior side). A plurality of (three in the present embodiment) bosses 30e are provided to the end wall 30c, with a space therebetween in the circumferential direction. The entire length of the bosses 30e between the end on the side of the end wall 30c and the end on the side of the open portion 30d is greater than the thickness of the rotor 25 between the second surface 25b and the first surface 25a, and is smaller than the entire length of the inner wall 30a.

As illustrated in FIGS. 2A and 7, the rotor 25 is provided with insertion holes 25e corresponding to the bosses 30e, respectively. Referring to FIG. 6, each of the insertion holes 25e is spatially connected, on the interior side, to the corresponding recess 25l in which the stabilizers 55 are disposed. The insertion hole 25e is larger than the outer diameter of the boss 30e, and the boss 30e is inserted thereinto, while permitting movements of the boss 30e in directions along the axis A. Accordingly, the knob 30 is relatively movable with respect to the rotor 25 in the directions along axis A.

Figure 8A:
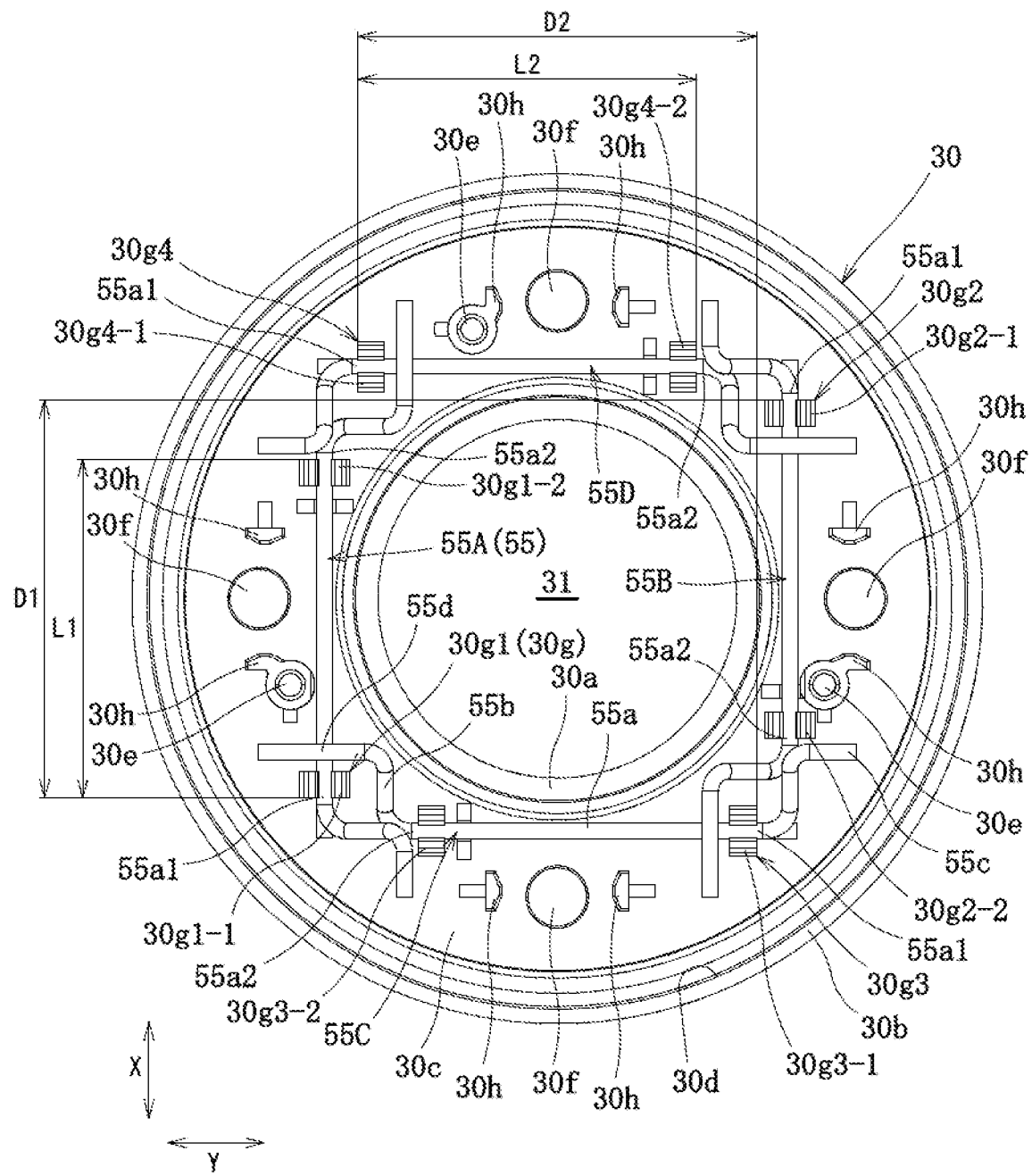
FIG. 8A is a front view illustrating an arrangement of the stabilizer with respect to the knob.

Referring to FIGS. 5 and 8A, the knob 30 is also provided with restricting portions 30h having a function of guiding movements in the directions along the axis A with respect to the rotor 25, and restricting movements along the circumferential direction about the axis A, with respect to the rotor 25. The restricting portions 30h are provided at four points at an interval of 90 degrees, and are provided as a pair in each of such points. Each pair of the restricting portions 30h is provided as substantially triangular prism-shaped ribs protruding in directions facing each other, and a block 25o including the seat 25l illustrated in FIG. 6 is held therebetween.

As illustrated in FIGS. 2A and 2B, the biasing members 33 are disposed between the rotor 25 and the knob 30, and apply a biasing force to the knob 30 in the direction separating from the rotor 25 along the axis A. Each of the biasing members 33 is made of elastic rubber (e.g., silicone rubber) and has a substantially conical tubular shape. However, the biasing member 33 may be a coil spring or a leaf spring, or may be a resin spring having a structure cutout from the rotor 25.

Specifically, as illustrated in FIGS. 5 and 5, the plurality of (four in the present embodiment) biasing members 33 are disposed on the second surface 25b of the rotor 25 at an equal interval along the circumferential direction. Each of the biasing members 33 includes an annular base portion 33a, a protruding portion 33b protruding from the base portion 33a in a conical tubular shape, and a columnar head 33c provided at a tip of the protruding portion 33b.

The second surface 25b of the rotor 25 is provided with the seats 25f where the biasing members 33 are disposed, respectively. The seats 25f are provided as recesses each of which has a circular cross section where the base portion 33a can be disposed, and are provided at angular positions that are different from the insertion holes 25e. The depth of the seat 25f in the direction in which the axis A extends is shallower than the entire height of the biasing member 33, and the head 33c of the biasing member 33 protrudes from the second surface 25b toward the side of the knob 30. A through hole 25g passed through the first surface 25a is provided at the bottom of the seat 25f. The through hole 25g allows the air accompanying elastic deformation of the biasing member 33 illustrated in FIGS. 2A and 2B to flow therethrough. Referring to FIG. 5, holding portions 30f each provided as a circular recess and holding the head 33c of the biasing member 33 are provided on the inner surface of the end wall 30c of the knob 30.

As illustrated in FIGS. 5 and 7, the first transmitting member (first conductive portion) 36 and the second transmitting member (second conductive portion) 37 making up the transmitting member 35 are conductively connected to each other by connecting portions 38 that are flexible and conductive. These members are disposed between the holder 20 and the ring member 15, and between the first surface 25a of the rotor 25 and the film 50.

The first transmitting member 36 is attached to the knob 30, and the second transmitting member 37 is attached to the rotor 25. A pressing operation of the knob 30 causes the first transmitting member 36 to move along the axis A in a manner associated with the movement of the knob 30, but the second transmitting member 37 remains unmoved. A rotating operation of the knob 30 causes the first transmitting member 36 to rotate integrally therewith, and causes the second transmitting member 37 to rotate integrally via the rotor 25. In other words, the first transmitting member 36 moves relatively with respect to the second transmitting member 37 along the axis A, but does not move relatively in the circumferential direction around the axis A.

The first transmitting member 36 is a C-shaped plate made of conductive rubber, and is made of a soft material that is more flexible than the holder 20, the rotor 25, and the knob 30. However, the first transmitting member 36 may be made of a metal (e.g., brass) or a resin, as long as such a material is conductive. An angle formed by the first end 36a and the second end 36b of the first transmitting member 36 in the circumferential direction is approximately 270 degrees. A radial width of the first transmitting member 36 is smaller than a radial width of an attachment member 40, which will be described later. The first transmitting member 36 is preferably as thick as possible in order to increase the electrostatic capacitance. In the present embodiment, the width is 5 mm, and the thickness is 1 mm in consideration of productivity.

The first transmitting member 36 is attached to the knob 30 via the attachment member 40 made of an insulating resin (such as nylon). The inner circumference of the first transmitting member 36 is provided with a positioning protrusion 36c protruding radially inward and is disposed at a predetermined position of the attachment member 40. The attachment member 40 will be described later in detail.

Figure 9:
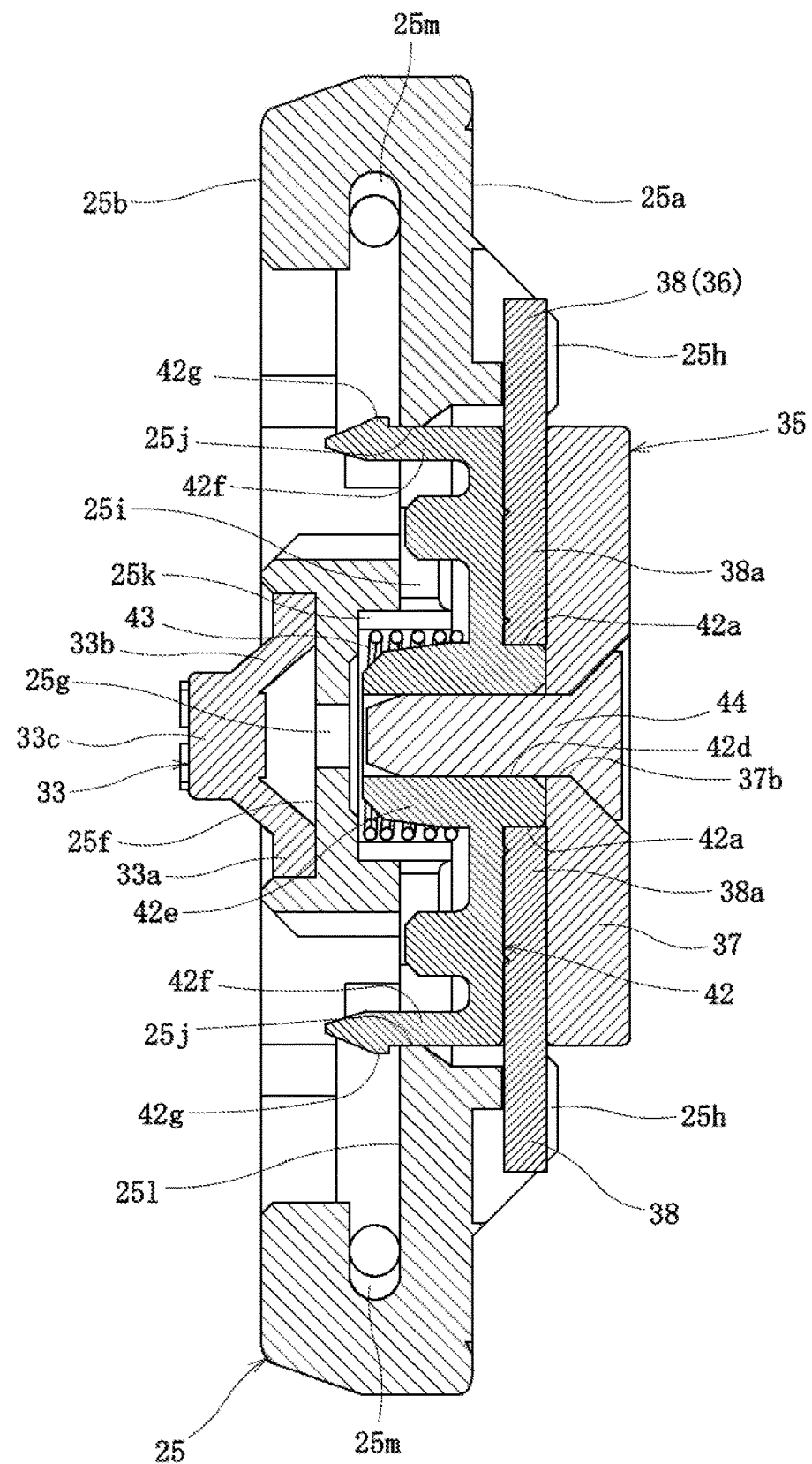
FIG. 9 is a cross-sectional view illustrating a structure of an arrangement of a second transmitting member.

As illustrated in FIGS. 7 and 9, the second transmitting member 37 is provided separately from the first transmitting member 36, and is integrated with the first transmitting member 36 via the connecting portions 38. The second transmitting member 37 is a substantially fan-shaped plate that is made of a conductive metal (e.g., brass). However, the second transmitting member 37 may be made of rubber or resin as long as the material is conductive.

The second transmitting member 37 is disposed between both ends 36a and 36b of the first transmitting member 36 so that the second transmitting member 37 is positioned concentrically with the first transmitting member 36, and is connected to the connecting portions 38 via the holding member 42. In order for the second transmitting member 37 to be disposed on the holding member 42, the second transmitting member 37 is provided with cutouts 37a cut out in a rectangular shape, and a pass-through portion 37b through which the screw 44 is passed. The holding member 42 will be described later in detail.

Continuing with reference to FIGS. 7 and 9, the connecting portions 38 are provided integrally with the first transmitting member 36, and protrude from the first end 36a and the second end 36b, respectively. By disposing the connecting portions 38 and the second transmitting member 37 on the holding member 42 in an overlapping manner, the first transmitting member 36 and the second transmitting member 37 are conductively connected to each other. However, the connecting portions 38 may be provided integrally with the second transmitting member 37 that is made of conductive rubber, or may be provided separately from the first transmitting member 36 and the second transmitting member 37, using an electrically conducting material.

The connecting portions 38 have arc shapes having such a curvature that these arcs extend concentrically with the first transmitting member 36. The width of the connecting portions 38 in the radial direction is narrower than the width of the first transmitting member 36 in the radial direction. With this, elastic deformation of the first transmitting member 36 is suppressed, while permitting elastic deformation of the connecting portions 38 that are continuous with the first transmitting member 36. In the present embodiment, the thickness of the connecting portions 38 in the direction along the axis A is the same as the thickness of the first transmitting member 36, but may be less than the thickness of the first transmitting member 36, to promote elastic deformation of the connecting portions 38.

A connector end 38a to be conductively connected to the second transmitting member 37 is provided on the tip end of each of the pair of connecting portions 38 provided as a pair. The connector end 38a has a circular shape when viewed from the direction in which the axis A extends, and has a diameter larger than the width of the connecting portion 38. At the center of the connector end 38a, a through hole 38b passed therethrough in the thickness direction is provided.

The length between the ends 36a, 36b of the first transmitting member 36 to the connector ends 38a is a dimension that can be designed to ensure some allowance (margin) between the first transmitting member 36 and the second transmitting member 37, when the knob 30 is not being operated. With this allowance, the connecting portions 38 allow the first transmitting member 36 to move relatively with respect to the second transmitting member 37.

As illustrated in FIGS. 2A and 7, the attachment member 40 is a plate body having a size capable of covering the first transmitting member 36. The radial width of the attachment member 40 is narrower than the radial width of the rotor 25.

A surface of the attachment member 40 facing the display panel is provided with a recessed groove 40a where the first transmitting member 36 is disposed. The recessed groove 40a is defined by an external wall 40b, an internal wall 40c, and the pair of end walls 40d. The external wall 40b has a C shape slightly larger than the first transmitting member 36, and a positioning groove 40e is provided in a portion corresponding to the positioning protrusion 36c of the first transmitting member 36. The internal wall 40c is an endless ring that is continuous. To each of the pair of end walls 40d provided as a pair, an insertion groove 40f through which the corresponding connecting portion 38 is inserted is provided.

The depth of the recessed groove 40a is shallower than the thickness of the first transmitting member 36 in the direction in which the axis A extends, and the first transmitting member 36 protrudes from the tip ends of the walls 40b to 40d. As attachment means for attaching the first transmitting member 36 to the recessed groove 40a, a method using an adhesive member such as a double-sided tape and an adhesive, or a method using a mechanical structure such as press fitting and a fixing piece may be used.

As illustrated in FIGS. 2A and 5, the attachment member 40 is provided with pass-through portions 40g through which screws (coupling members) 41 are passed, respectively. The attachment member 40 is provided with positioning projections 40h protruding toward the rotor 25, disposed between the restricting portions 30h that are passed through the through hole 25n, respectively, and restricting relative movement (including rotation) of the attachment member 40 with respect to the knob 30 in the circumferential direction. An outer circumferential surface of the attachment member 40 is provided with an abutting portion 40i protruding radially outwards and abuts against the first holding portion 20b when the knob 30 is not being operated. By the abutting portion 40i abutting against the first holding portion 20b, further movement of the knob 30 toward the interior side and movement of the attachment member 40 including the first transmitting member 36 are restricted.

As illustrated in FIG. 2A, by tightening the screws 41 passed through the pass-through portions 40g, respectively, into the bosses 30e, respectively, the first transmitting member 36 is coupled to the knob 30 with the attachment member 40 therebetween, and this attachment to the rotor 25 is maintained. While the knob 30 is not being operated, the abutting portion 40i is kept in abutment against the first holding portion 20b by the biasing force of the biasing members 33, whereby the first transmitting member 36 is retracted to a position near the first surface 25a of the rotor 25. As illustrated in FIG. 2B, a pressing operation of the knob 30 advances the first transmitting member 36 to a position in contact with the film 50 along the axis A.

Referring to FIGS. 7 and 9, the holding member 42 is a fan-shaped plate body corresponding to the shape of the second transmitting member 37. The holding member 42 is disposed on the first surface 25a of the rotor 25, and a spring 43 applies a biasing force to the holding member 42 toward the exterior side.

Figure 10A:
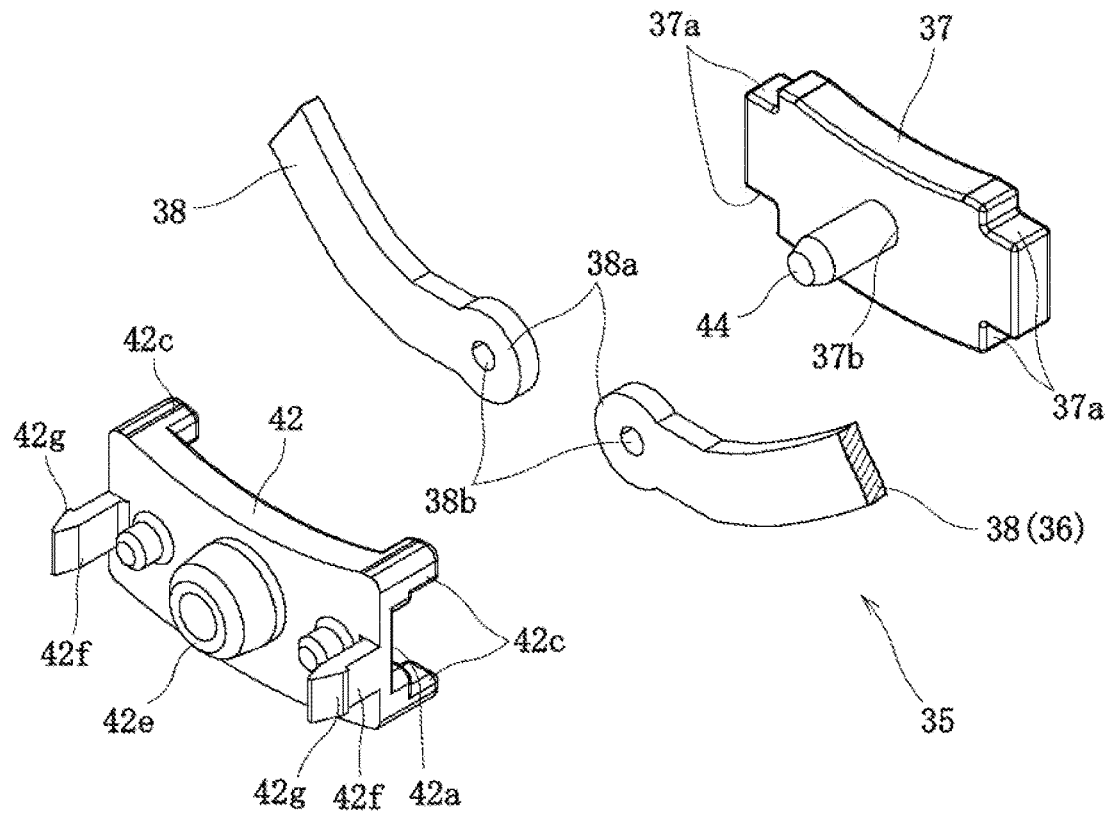
FIG. 10A is an exploded front perspective view of the first transmitting member, the second transmitting member, and the holding member illustrated in FIG. 7.
Figure 10B:
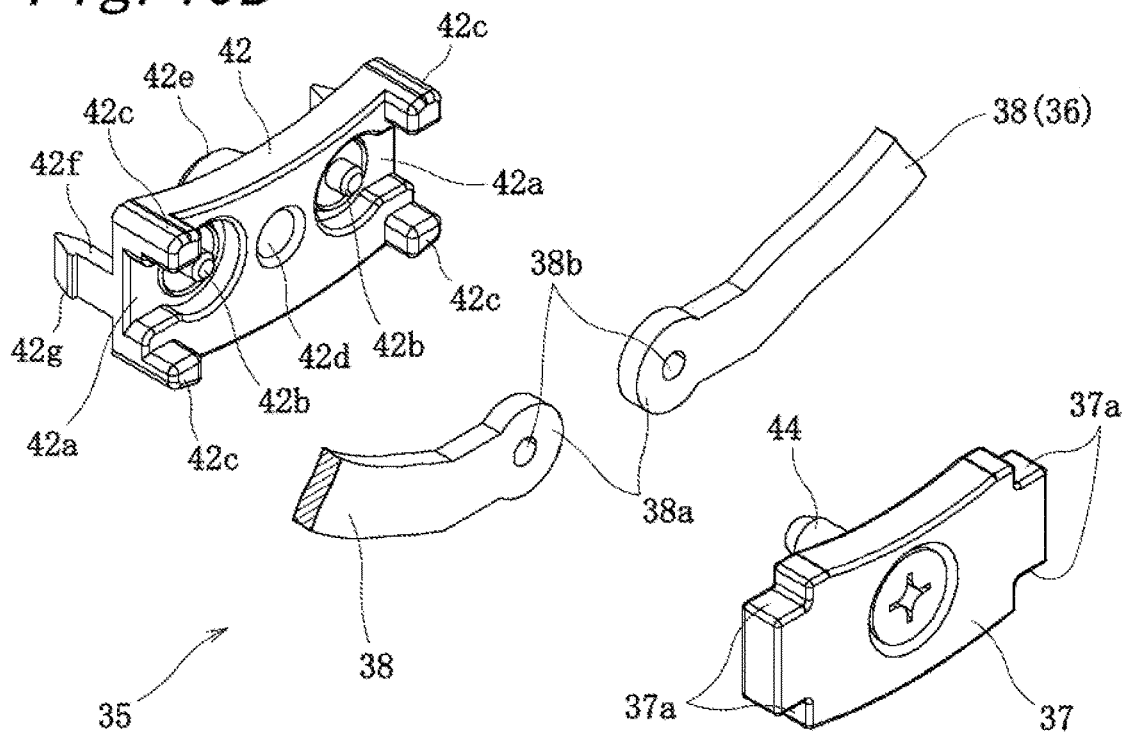
FIG. 10B is an exploded rear perspective view of the first transmitting member, the second transmitting member, and the holding member illustrated in FIG. 7.

Referring to FIGS. 10A and 10B, a pair of depressions 42a in which the tip ends of the pair of connecting portions 38 are disposed, respectively, are provided on the surface of the holding member 42 on the exterior side. Each of the depressions 42a includes a circular portion in which the connector end 38a is disposed, and a rectangular portion extending from the circular portion toward a corresponding side surface of the holding member 42. The depth of the depression 42a is shallower than the thickness of the connecting portion 38, and the connecting portion 38 protrudes from the holding member 42. Cylindrical protruding portions 42b passed through the through holes 38b, respectively, are provided inside the respective circular portions of the depressions 42a, respectively. The size by which the protruding portion 42b protrudes is smaller than the depth of the depression 42a.

On the exterior side of the holding member 42, positioning projections 42c to be positioned inside respective cutouts 37a are further provided. The size by which the positioning projections 42c protrude is smaller than the thickness of the second transmitting member 37, and the second transmitting member 37 protrudes from the holding member 42. A screw hole 42d for fastening the second transmitting member 37 with a screw is provided at the center of the holding member 42.

After the connector ends 38a are disposed inside the respective depressions 42a, the second transmitting member 37 is then disposed on the exterior side of the connector ends 38a, and the screw 44 passed through the pass-through portion 37b is fastened into the screw hole 42d. With this, the connecting portions 38 are sandwiched between the second transmitting member 37 and the holding member 42 in a manner in contact to each other, with pressure applied thereto, so that the connecting portions 38 (first transmitting member 36) and the second transmitting member 37 are ensured to be conducting.

A cylindrical projection 42e on which one end of the spring 43 is disposed is provided on the interior side of the holding member 42. The projection 42e is provided coaxially with the axis of the screw hole 42d. A pair of locking pieces 42f protruding toward the rotor 25 is provided at respective circumferential ends of the holding member 42. Each of the locking pieces 42f is locked to the rotor 25, and includes a claw 42g for preventing the locking piece 42f from being detached from the rotor 25.

Referring to FIG. 7, the first surface 25a of the rotor 25 is provided with guide ribs 25h that restrict the respective ends of the holding member 42 in the circumferential direction. Each of the pair of guide ribs 25h is provided in a manner extending in the circumferential direction. An attachment portion 25i to which the holding member 42 is attached is provided between the pair of guide ribs 25h.

The attachment portion 25i is provided adjacently to the exterior side of one of the seats 25f. Referring to FIG. 9, the attachment portion 25l includes a pair of through holes 25j through which the locking pieces 42f are passed, respectively, and a recess 25k where the spring 43 is disposed. The interior side of the through hole 25j spatially communicates with the recess 25l where the stabilizer 55 is disposed, A recess 25k is provided between the pair of through holes 25j in a manner recessed from the exterior side toward the interior side. Ensured between the rim of the through hole 25j positioned on the side of the second surface 25b and the claw 42g is a gap allowing the holding member 42 to move in the directions along the axis A with respect to the rotor 25.

As illustrated in FIGS. 3 and 4, the ring member 45 is an annular cylindrical body disposed adjacently to the outer side of the inner wall 30a and having its center at the axis A. The ring member 45 is made of an insulating resin (for example, ABS).

The ring member 45 includes a base portion 45a fixed to the inner circumference of the film 50, and a protruding portion 45b protruding from the outer circumference of the base portion 45a toward the inner side of the knob 30. The axial size of the ring member 45 is smaller than that of the holder 20. While the knob 30 is not being operated, the end of the ring member 45 is positioned on the opposite side of the display panel 1, with respect to the rim of the inner wall 30a delineating the open portion 30d. In other words, while the knob 30 is not being operated, the interior-side end of the protruding portion 45b is positioned closer to the end wall 30c than to the open portion 30d of the knob 30, as illustrated in FIG. 2A.

Now referring to FIGS. 3 and 4, the film 50 is an annular member having an opening 51 through which a part of the display panel 1 is exposed, and that has its center at the axis A. The film 50 is made of a resin (such as PET) having an excellent insulation property, water resistance, and heat resistance. The film 50 has a thickness smaller than the minimum thickness of a wall of a resin molded product that can be manufactured by injection molding. Specifically, the thickness of the film 50 is preferably 0.05 mm or more and 0.2 mm or less, and is 0.1 mm in the present embodiment. The film 50 is fixed to the exterior-side end surface of the holder 20 and the ring member 45, and covers the first transmitting member 36 and the second transmitting member 37 on the side of the display panel 1.

The outer diameter of the film 50 is the same as the outer diameter of the largest portion of the holder 20, and the inner diameter of the film 50 is the same as the inner diameter of the smallest portion of the ring member 45. Because the base portion 45a of the ring member 45 according to the present embodiment protrudes radially inwards from the protruding portion 45b so that an area for bonding is ensured, the inner diameter of the film 50 is set to the same size as the inner diameter of the base portion 45a.

Referring to FIG. 2A, an adhesive layer 52a is provided on a surface of the film 50 on the exterior side facing the display panel 1. An adhesive layer 52b for fixing the holder 20 is provided on an outer circumference of a surface of the film 50 on the interior side, and an adhesive layer 52c for fixing the ring member 45 is provided on the inner circumference.

Figure 8B:
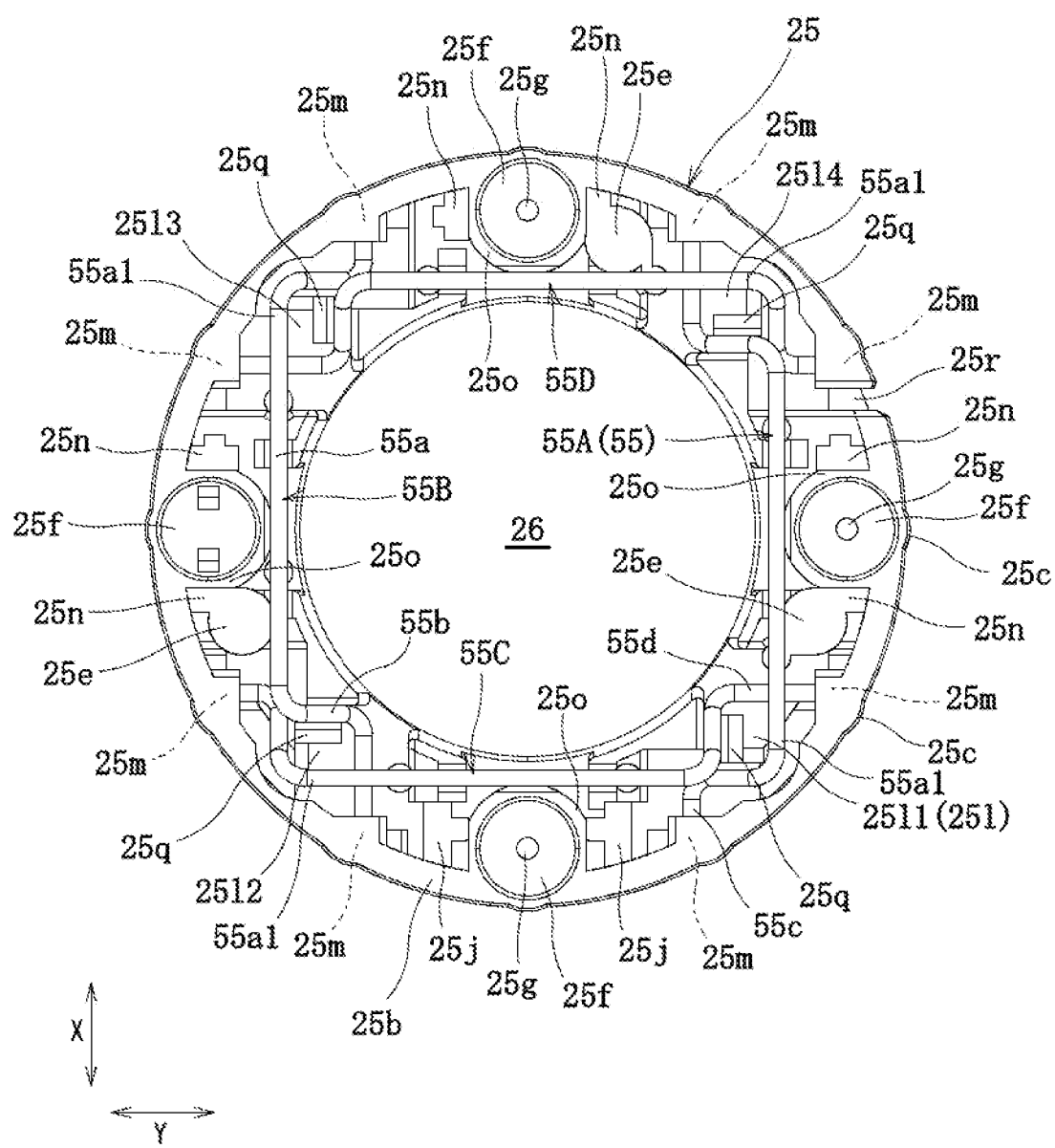
FIG. 8B is a front view illustrating an arrangement of the stabilizer with respect to the rotor.

As illustrated in FIGS. 6, 3A, and 8B, the operation knob apparatus 10 includes a stabilizer 55 that suppresses tilting of the knob 30 with respect to the rotor 25 during the operation of being pressed. The stabilizer 55 is disposed in plurality between the second surface 25b of the rotor 25 and the end wall 30c of the knob 30. In the present embodiment, the four stabilizers 55 are arranged at intervals of 90 degrees in the circumferential direction around the axis A, in a manner extending in parallel with the second surface 25b.

Each of the stabilizers 55 is made of a wire rod, and includes a straight rod-shaped main body 55a, a pair of arms 55b connected to the respective ends of the main body 55a, and base portions 55c and 55d connected to the respective arms 55b.

The main body 55a is disposed adjacent to the radially outer side of the inner wall 30a of the knob 30. The main bodies 55a of the stabilizers 55 facing each other in the radial directions of the rotor 25 and of the knob 30 extend in parallel with each other, and the main bodies 55a of the adjacent stabilizers 55 extend orthogonally to each other.

Each of the pair of arms 55b is bent with respect to the main body 55a in a manner protruding in the same direction from the outer end of the main body 55a. Each of the arms 55b is continuous with the main body 55a via a curved portion with a predetermined curvature. In the present embodiment, the angle formed by the main body 55a and the arm 55b is 90 degrees, and the arms 55b extend in a direction orthogonal to the main body 55a.

The base portions 55c and 55d are bent with respect to the respective arms 55b, in a manner projecting out from the respective arms 55b, in directions separating from each other. The base portions 55c and 55d are continuous with the arms 55b, respectively, via the curved portions each of which has a predetermined curvature. In the present embodiment, the angle formed by the arm 55b and the base portion 55c, and the angle formed by the arm 55b and the base portion 55d are 90 degrees, and the base portions 55c and 55d are positioned in parallel with the main body 55a. However, the angle formed by the main body 55a and the arms 55b, and the angle formed by the arms 55b and the base portions 55c and 55d, respectively, may be any angle other than 90 degrees, as long as the base portions 55c and 55d are positioned parallel with the main body 55a.

Between the two base portions 55c and 55d, the entire length of the first base portion 55c is shorter than the entire length of the second base portion 55d. In other words, the size from the arm 55b to the tip of the first base portion 55c is smaller than the size from the arm 55b to the tip of the first base portion 55d. The second base portion 55d is disposed in a manner intersecting with the main body 55a of the stabilizer 55 adjacent thereto.

The structure for attaching each of the stabilizers 55 will now be explained more specifically, Referring to FIG. 8A, the main body 55a is rotatably held by holding portions 30g provided to the knob 30. Referring to FIG. 8B, the base portions 55c and 55d are slidably and rotatably held in the holding grooves 25m, respectively, provided to the rotor 25. With this, the arms 55b are inclined with respect to the rotor 25, and this tilting allows the adjacent stabilizers 55 to be three-dimensionally arranged without interfering with one another (see FIG. 5). However, the main body 55a may be held by the rotor 25 rotatably, and the base portions 55c and 55d may be held by the knob 30 slidably and rotatably.

In the following description, among the four stabilizers 55, one positioned on the left side in FIG. 8A and on the right side in FIG. 8B is sometimes referred to as a stabilizer (first stabilizer) 55A, One positioned on the right side in FIG. 8A and on the left side in FIG. 8B is sometimes referred to as a stabilizer (second stabilizer) 55B. One positioned on the lower side in FIGS. 8A and 86 is sometimes referred to as a stabilizer (third stabilizer) 55C, and one positioned on the upper side in FIGS. 8A and 8B is sometimes referred to as a stabilizer (fourth stabilizer) 55D. These stabilizers 55 A to 55d all have the same shape.

As illustrated in FIGS. 6, 8A, and 8B, the main bodies 55a of the stabilizers 55A and 556 extend, with respect to the knob 30, in the X direction (first direction) that is parallel with the second surface 25b of the rotor 25 and the end wall 30c of the knob 30, and are disposed with a space therebetween in the Y direction (second direction) orthogonal to the X direction. The main bodies 55a of the stabilizers 55C and 55D extend in the Y direction with respect to the knob 30, and are disposed with a space therebetween in the X direction.

The stabilizers 55A and 55B are disposed in a manner shifted with respect to each other in the X direction. Specifically, the main body 55a of the stabilizer 55A has a first end 55a1 positioned on the lower side (one side) in the X direction and a second end 55a2 positioned on the upper side (the other side) in the X direction. The main body 55a of the stabilizer 55B has a first end 55a1 positioned on the upper side in the X direction and a second end 55a2 positioned on the lower side in the X direction. The first end 55a1 of the stabilizer 55B is positioned above the first end 55a1 and the second end 55a2 of the stabilizer 55A in the X direction. The second end 55a2 of the stabilizer 558 is positioned between the first end 55a1 and the second end 55a2 of the stabilizer 55A in the X direction.

The stabilizers 55C and 55D are disposed in a manner shifted with respect to each other in the Y direction. Specifically, the main body 55a of the stabilizer 55C has the first end 55a1 positioned on the side of the stabilizer 558, that is, on the right side (one side) in the Y direction in FIG. 8A, and the second end 55a2 positioned on the side of the stabilizer 55A, that is, on the left side (the other side) in the Y direction in FIG. 8A. The main body 55a of the stabilizer 55D has the first end 55a1 positioned on the side of the stabilizer 55A, that is, on the left in the Y direction in FIG. 8A, and the second end 55a2 positioned on the side of the stabilizer 558, that is, on the right side in the Y direction in FIG. 8A. The first end 55a1 of the stabilizer 55D is positioned closer to the stabilizer 55A than the first end 55a1 and the second end 55a2 of the stabilizer 55C, that is, positioned on the left side in the Y direction in FIG. 8A. The second end 55a2 of the stabilizer 55D is positioned between the first end 55a1 and the second end 55a2 of the stabilizer 55C in the Y direction.

As illustrated in FIGS. 5 and 8A, the holding portions 30g of the knob 30 include first holding portions 30g1 for holding the main body 55a of the stabilizer 55A, second holding portions 30g2 for holding the main body 55a of the stabilizer 55B, third holding portions 30g3 for holding the main body 55a of the stabilizer 55C, and fourth holding portions 30g4 for holding the main body 55a of the stabilizer 55D.

The first holding portions 30g1 include a first portion 30g1-1 configured to hold the stabilizer 55A near the first end 55a1 and a second portion 30g1-2 configured to hold near the second end 55a2. The second holding portions 30g2 include a first portion 30g2-1 configured to hold the stabilizer 55B near the first end 55a1, and a second portion 30g2-2 configured to hold near the second end 55a2. The third holding portions 30g3 include a first portion 30g3-1 configured to hold the stabilizer 55C near the first end 55a1, and a second portion 30g3-2 configured to hold near the second end 55a2. The fourth holding portions 30g4 include a first portion 30g4-1 configured to hold the stabilizer 55D near the first end 55a1, and a second portion 30g4-2 configured to hold near the second end 55a2.

The individual first portions 30g1-1 to 30g4-1 and second portions 30g1-2 to 30g4-2 have the same structure. The structure includes a pair of protruding portions protruding from the end wall 30c of the knob 30 toward the open portion 30d, and claws protruding from these protruding portions, respectively, in directions approaching each other.

In the individual holding portions 30g1 to 30g4, the distances from the first portions 30g1-1 to 30g4-1 to the second portions 30g1-2 to 30g4-2 are all the same. A distance D1 in the X direction from the outer end of the first portion 30g1-1 of the first holding portion 30g1 to the outer end of the first portion 30g2-1 of the second holding portion 30g2 is longer than a distance L1 in the X direction from the outer end of the first portion 30g1-1 of the first holding portion 30g1 to the outer end of the second portion 30g2-2 of the first holding portion 30g1. A distance D2 in the Y direction between the outer end of the first portion 30g3-1 of the third holding portion 30g3 and the outer end of the first portion 30g4-1 of the fourth holding portion 30g4 is longer than a distance L2 in the X-Y direction between the outer end of the first portion 30g4-1 of the fourth holding portion 30g4 and the outer end of the second portion 30g4-2 of the fourth holding portion 30g4. The distances D1 and D2 (D1=D2) are set less than 130% of the distances L1 and L2 (L1=L2) (1<D/L<1.3).

The stabilizers 55 A to 55D are disposed on the knob 30 in such a manner that the first end 55a1 of one stabilizer 55 and the second end 55a2 of another stabilizer 55 adjacent thereto are adjacent to each other in the X direction or the Y direction, and the main bodies 55a thereof form a square shape as a whole. Specifically, the first end 55a1 of the stabilizer 55A and the second end 55a2 of the stabilizer 55C are adjacent to each other with a space therebetween in the Y direction. Specifically, the first end 55a1 of the stabilizer 55C and the second end 55a2 of the stabilizer 55B are adjacent to each other with a space therebetween in the X direction. The first end 55a1 of the stabilizer 55B and the second end 55a2 of the stabilizer 55D are adjacent to each other with a space therebetween in the Y direction. The first end 55a1 of the stabilizer 55D and the second end 55a2 of the stabilizer 55A are adjacent to each other with a space therebetween in the X direction. The second base portion 55d of each of the stabilizers 55 intersects with the main body 55a of the stabilizer 55 adjacent thereto.

As illustrated in FIGS. 6 and 83, the base portions 55c and 55d are disposed inside the recess 25l formed on the second surface. 25b of the rotor 25, and are held by the holding grooves 25m, respectively, formed inside the outer circumferential portion of the rotor 25.

Figure 11:
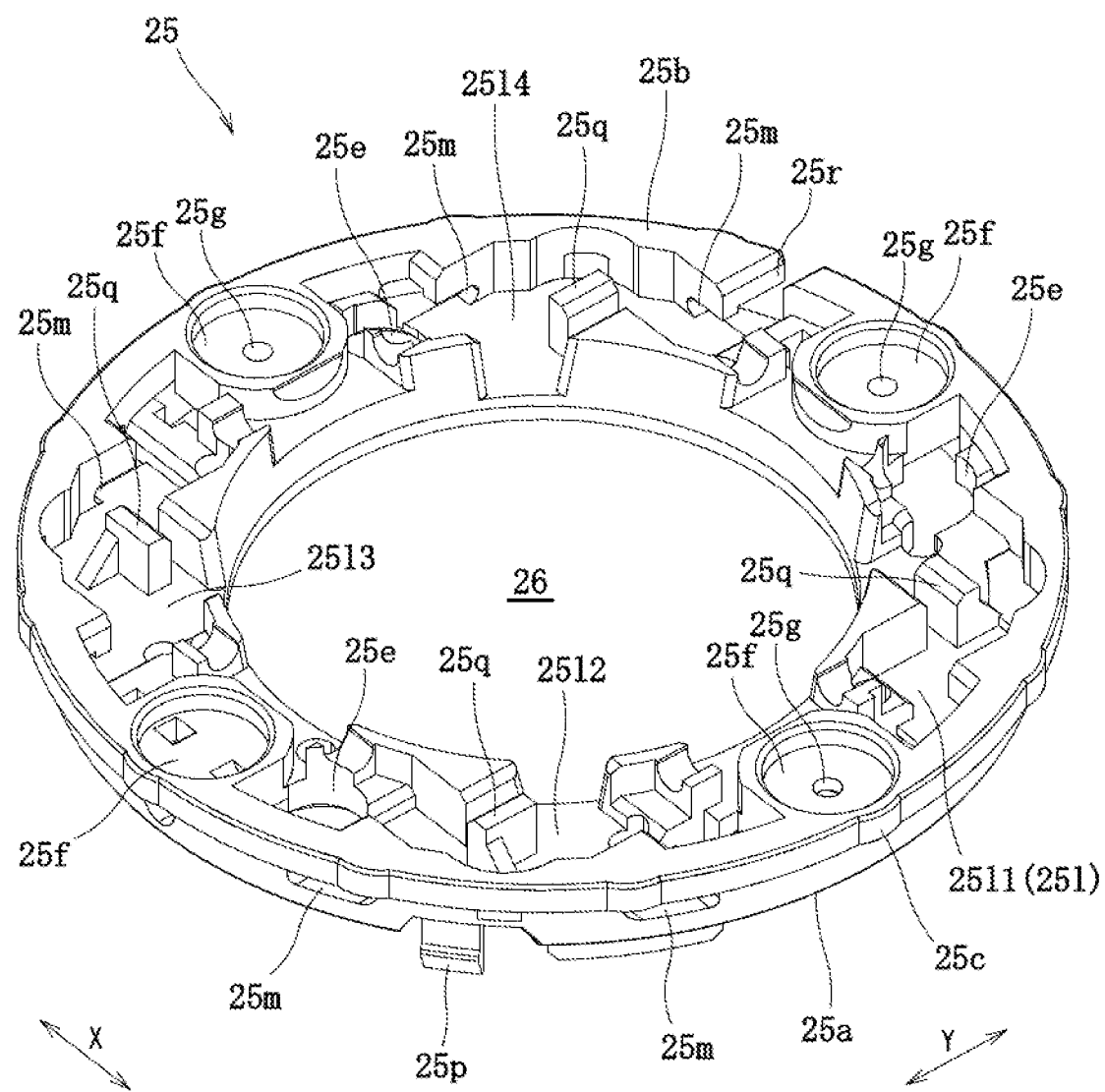
FIG. 11 is a perspective view of the rotor.

Referring to FIG. 11, the recesses 25l are provided at four angular positions that are different from those where the insertion holes 25e and the seats 25f are provided. Each of the recesses 25l is recessed from the interior side to the exterior side, and includes a bottom surface where the base portions 55c and 55d are allowed to move. In these recesses 25l, guides 25g for supporting the arms 55b that are continuous with the respective base portions 55c and 55d are provided upright, respectively. Areas where the recess 25l, the insertion hole 25e, and the through hole 25j are provided spatially communicate with one another.

Specifically, the first base portion 55c of the stabilizer 55A and the second base portion 55d of the stabilizer 55C are disposed inside the recess 25l that is positioned at the lower right in FIG. 8B. The first base portion 55c of the stabilizer 55C and the second base portion 55d of the stabilizer 55B are disposed inside the recess 25/2 that is positioned at the lower left in FIG. 8B. The first base portion 55c of the stabilizer 55B and the second base portion 55d of the stabilizer 55D are disposed inside the recess 25/3 that is positioned at the upper left in FIG. 8B. The first base portion 55c of the stabilizer 55D and the second base portion 55d of the stabilizer 55A are disposed inside the recess 25/4 that is positioned at the upper right in FIG. 8B.

Each of the holding grooves 25m is a long pass-through hole spatially communicating with the inside of the corresponding recess 25l, and is a pass-through hole extending between the recess 25l and the outer circumferential surface of the rotor 25. For one recess 25l, two holding grooves 25m are provided, that is, eight holding grooves are provided in total. A pair of the holding grooves 25m formed inside each of the recess 25/1 to 25/4 extends orthogonally to each other, and base portions 55c and 55d of different stabilizers 55 are placed inside, respectively. By disposing the tips of the base portions 55c and 55d inside the holding grooves 25m, respectively, the base portions 55c and 55d are allowed to move along the second surface 25b.

Specifically, the holding groove 25m where the first base portion 55c of the stabilizer 55A is disposed is provided to and passed through the recess 25/1 in the X direction, and the holding groove 25m where the second base portion 55d of the stabilizer 55C is disposed is provided to and passed through the recess 25/1 in the Y direction. The holding groove 25m where the first base portion 55c of the stabilizer 55C is disposed is provided to and passed through recess 25/2 in the Y direction, and the holding groove 25m where the second base portion 55d of the stabilizer 55B is disposed is provided to and passed through the recess 25/2 in the X direction. The holding groove 25m where the first base portion 55c of the stabilizer 55B is disposed is provided to and passed through the recess 2513 in the X direction, and the holding groove 25m where the second base portion 55d of the stabilizer 55D is disposed is provided to and passed through the recess 25/3 in the Y direction. The holding groove 25m where the first base portion 55c of the stabilizer 55D is disposed is provided and passed through the recess 25/4 in the Y direction, and the holding groove 25m where the second base portion 55d of the stabilizer 55A is disposed is provided and passed through the recess 25/4 in the X direction.

Among the plurality of holding grooves 25m, the holding groove 25m in which the first base portion 55c of the stabilizer 55D is disposed is provided with a communicating groove 25r connecting the inside and the outside of the holding groove 25m. The communicating groove 25r is provided at the tip of the holding groove 25m that is a position into which the first base portion 55c of the stabilizer 55D is inserted during its assembly. The communicating groove 25r is formed across a range from the bottom surface of the recess 25/4 to the second surface 25b, and across a range from the recess 25/4 to the outer circumferential surface of the rotor 25 in the Y direction.

Explained now is how to the stabilizers 55 are assembled.

The stabilizers 55, not assembled to the knob 30, are assembled to the rotor 25 in the order of the stabilizer 55A, the stabilizer 55C, the stabilizer 55B, and the stabilizer 55D.

Figure 12A:
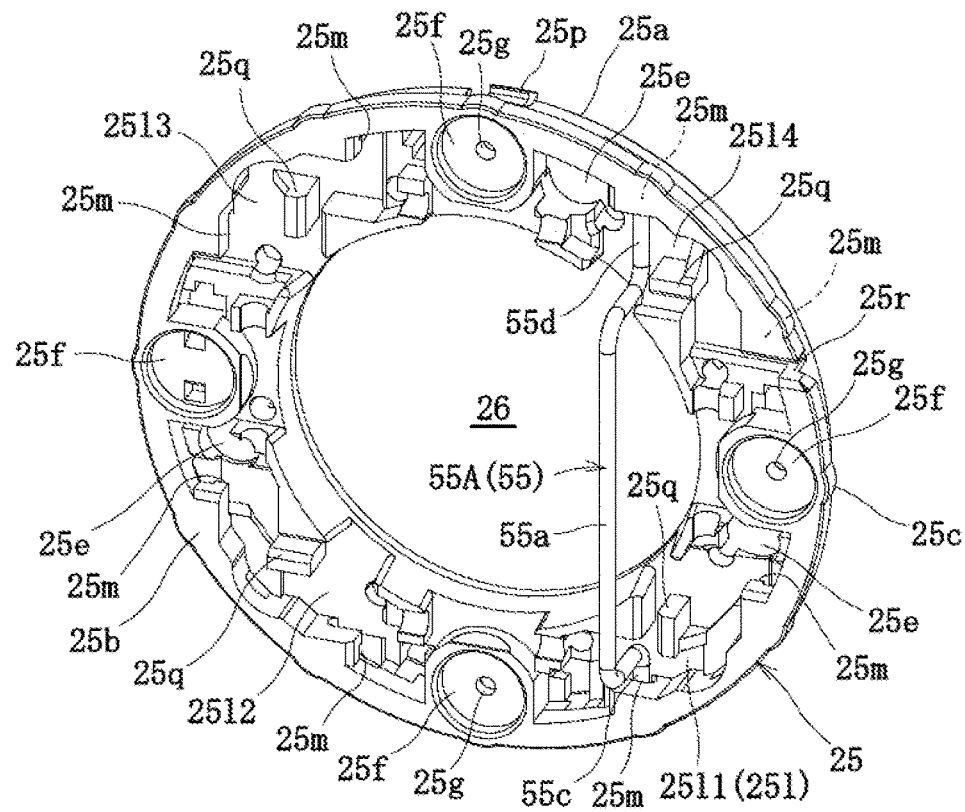
FIG. 12A is a perspective view illustrating a process of assembling the stabilizer to the rotor.

To begin with, as illustrated in FIG. 12A, the stabilizer 55A is placed on the second surface 25b of the rotor 25. The first base portion 55c is then disposed inside the recess 25/1, and the second base portion 55d is disposed inside the recess 25/4. The stabilizer 55A is then slid outwards in the radial direction of the rotor 25 (rightward in the Y direction in FIG. 12A), to insert the base portions 55e and 55d into the respective holding grooves 25m.

Figure 12B:
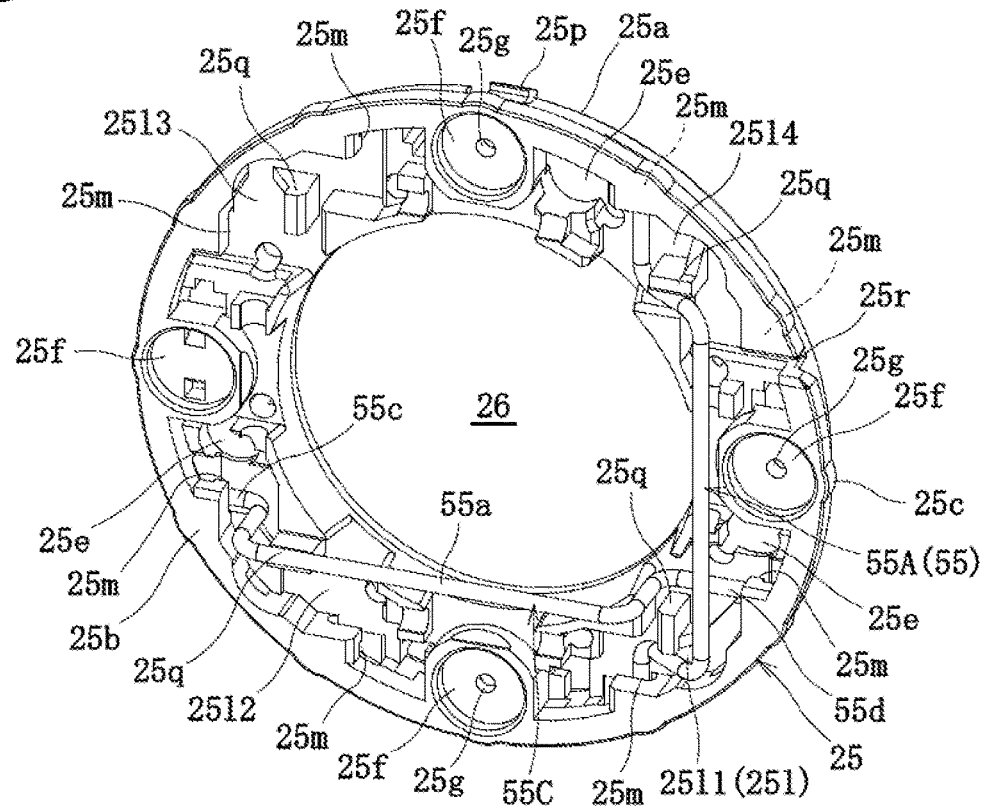
FIG. 12B is a perspective view illustrating another process of assembling the stabilizer to the rotor.

The stabilizer 55A is then rotated and laid outwards in the radial direction of the rotor 25, as illustrated in FIG. 12B. The stabilizer 55C is then placed on the second surface 25b of the rotor 25. The first base portion 55c is then disposed inside the recess 25/2, and the second base portion 55d is disposed inside the recess 25/1. At this time, the second base portion 55d of the stabilizer 55C is inserted between the main body 55a of the stabilizer 55A, which has been disposed earlier, and the bottom surface of the recess 25/1. The stabilizer 55C is then slid outwards in the radial direction of the rotor 25 (downward in the X direction in FIG. 12B), to insert the base portions 55c and 55d into the respective holding grooves 25m.

Figure 12C:
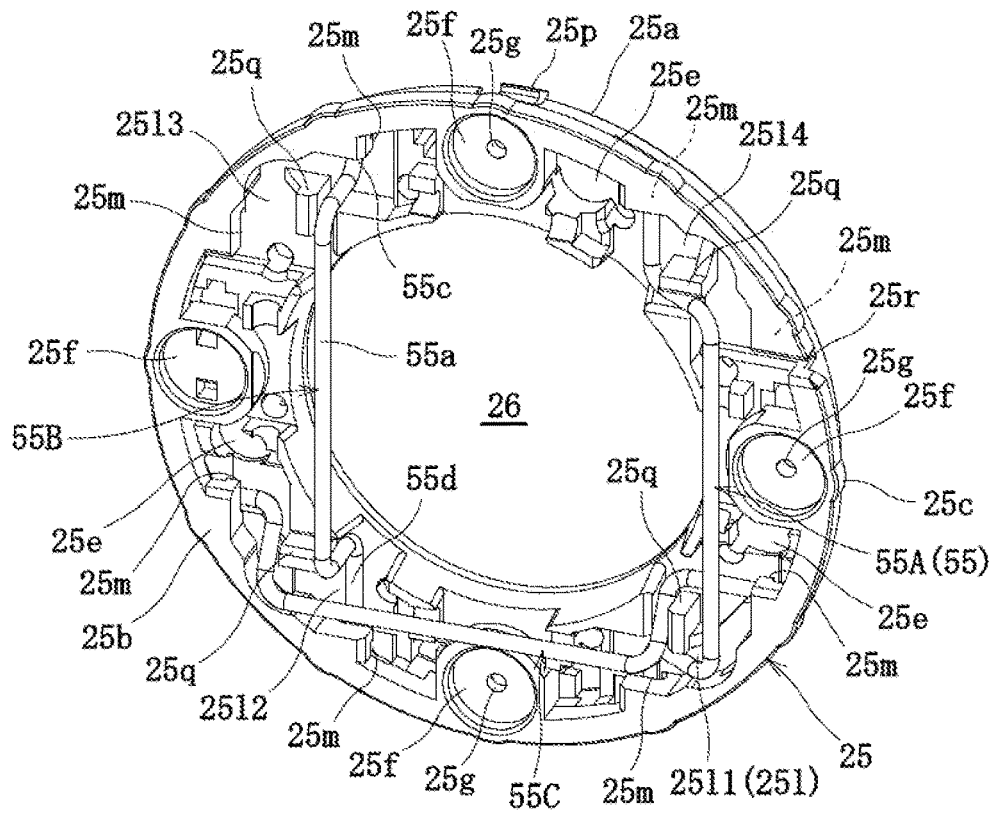
FIG. 12C is a perspective view illustrating another process of assembling the stabilizer to the rotor.

The stabilizer 55C is then rotated and laid outwards in the radial direction of the rotor 25, as illustrated in FIG. 12C. The stabilizer 55B is then placed on the second surface 25b of the rotor 25. The first base portion 55c is then disposed inside the recess 25/3, and the second base portion 55d is disposed inside the recess 25/2. At this time, the second base portion 55d of the stabilizer 55B is inserted between the main body 55a of the stabilizer 55C, which has been disposed earlier, and the bottom surface of the recess 25/2. The stabilizer 55B is then slid outwards in the radial directions of the rotor 25 (leftward in the Y direction in FIG. 12C), to insert the base portions 55c and 55d into the respective holding grooves 25m.

Figure 12D:
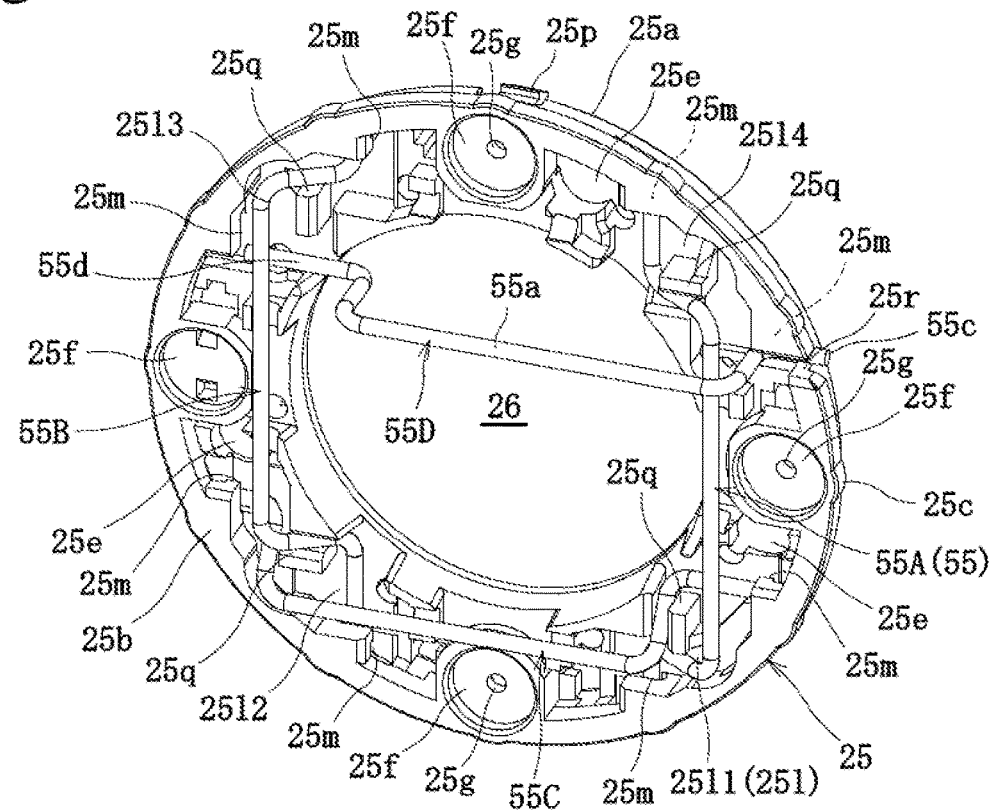
FIG. 12D is a perspective view illustrating another process of assembling the stabilizer to the rotor.

The stabilizer 55B is then rotated and laid outwards in the radial direction of the rotor 25, as illustrated in FIG. 12D. The stabilizer 55D is then placed on the second surface 25b of the rotor 25. The first base portion 55c is then disposed inside the recess 25/4, and the second base portion 55d is disposed inside the recess 25/3. At this time, the second base portion 55d of the stabilizer 55D is inserted between the main body 55a of the stabilizer 55B, which has been disposed earlier, and the bottom surface of the recess 25/3. In addition, unlike the stabilizers 55A, 55B, and 55C assembled previously, because the main body 55a of the stabilizer 55A assembled previously exists in the recess 25/4, the first base portion 55c of the stabilizer 55D cannot be disposed inside the recess 25/4 from the direction of the axis A. However, because the communicating groove 25r is provided to the holding groove 25m where the first base portion 55c is disposed, the first base portion 55c can be disposed inside the recess portion 25/4, and the second base portion 55d can be disposed inside the recess portion 25/3 by moving the stabilizer 55D in the Y direction. After disposing the stabilizer 551J, the stabilizer 55D is then rotated and laid outwards in the radial direction of the rotor 25, as illustrated in FIG. 8B.

When all of the stabilizers 55A to 55D are completely attached to the rotor 25, the biasing member 33 is disposed on the rotor 25, and the main bodies 55a of the stabilizers 55 are inserted into the holding portions 30g of the knob 30, respectively, and held thereby, respectively. This completes the attachment of the knob 30 onto the rotor 25 with the stabilizers 55 therebetween.

An operation of the operation knob apparatus 10 will now be explained.

As illustrated in FIG. 2A, while the knob 30 is not being operated, the knob 30 is held at a position separated from the rotor 25 by the biasing force of the biasing members 33. As a result, the first transmitting member 36 coupled to the bosses 30e is at a position separated from the film 50. The second transmitting member 37 is held at a position abutting against the film 50, by the biasing force of the spring 43.

While not being operated, the electrostatic capacitance of the part of the display panel 1 facing the first transmitting member 36 does not change, and only the electrostatic capacitance of the part facing the second transmitting member 37 changes. However, the position where the electrostatic capacitance has changed by the second transmitting member 37 remains at a predetermined position. Therefore, the display panel 1 can detect that knob 30 is not operated.

When the knob 30 is pressed, the knob 30 is moved toward the rotor 25 against the biasing force of the biasing member 33. At this time, if no stabilizers 55 are adopted and the user makes the operation at an unbalanced position on the circumferential side of the knob 30 that is an annular body, the knob 30 would become tilted with respect to the rotor 25. However, because the stabilizers 55 are adopted in the present embodiment, the main bodies 55a of the stabilizers 55 are pressed as the knob 30 is operated, and the base portions 55c and 55d move along the bottom surface of the recesses 25l and the holding grooves 25m. As a result, the tilting of the knob 30 with respect to the rotor 25 is suppressed. In addition, the linear movement of the knob 30 brings the first transmitting member 36 near to or into surface contact with the film 50, in parallel, via the bosses 30e.

The pressing operation also causes the electrostatic capacitance of the display panel 1 to change not only in the part facing the second transmitting member 37 but also in the part facing the first transmitting member 36. Therefore, the area where the electrostatic capacitance of the display panel 1 changes becomes increased, compared with when the operation is not made. With this increase in the area where the electrostatic capacitance changes, the display panel 1 can detect the pressing operation of the knob 30.

When the pressing operation stops, the biasing force of the biasing members 33 moves the knob 30 and the first transmitting member 36 toward the interior side with respect to the rotor 25. As a result, because the change in the electrostatic capacitance of the part facing the first transmitting member 36 disappears from the display panel 1, the area where the electrostatic capacitance changes becomes rather local, compared with that when the pressing operation is being made. With this decrease in the area where the electrostatic capacitance changes, the display panel 1 can detect release of the pressing operation of the knob 30.

When the knob 30 is operated to be rotated, the second transmitting member 37 is caused to rotate, too, via the rotor 25. At this time, because the knob 30 is held separated from the rotor 25 by the biasing members 33, the first transmitting member 36 is also kept separated from the film 50.

In the display panel 1, a rotating operation does not change the electrostatic capacitance of the part facing the first transmitting member 36, and but changes only the electrostatic capacitance of the part facing the second transmitting member 37, with the position of the change rotated about the axis A. Therefore, the display panel 1 can detect the rotating operation of the knob 30 including a direction (a clockwise or counterclockwise direction) in which knob 30 is rotated.

When the rotating operation stops, the rotations of the rotor 25 and the second transmitting member 37 also stop. As a result, the movement of the position of the electrostatic capacitance change stops in the display panel 1. Therefore, the display panel 1 can detect that the rotating operation of the knob 30 has been stopped.

The operation knob apparatus 10 having the configuration described above has the following features.

Because the stabilizers 55 are disposed between the rotor (base) 25 and the knob (operation member) 30, it is possible to suppress the tilting of the knob 30 with respect to the rotor 25 during the pressing operation, and to improve the posture stability of the knob 30. Therefore, it is possible to improve the user operability of the knob 30. In addition, it is possible to bring the first transmitting member 36 moving in a manner associated with the movement of the knob 30 into surface contact with display panel 1. Therefore, the operation of the knob 30 can be transmitted reliably to the display panel 1, so that the detecting performance of the display panel 1 can be improved.

Moreover, because the first transmitting member 36 according to the present embodiment is made of a soft material, when the knob 30 is pressed strongly and the knob 30 moves too far, the first transmitting member 36 can deform elastically. With the synergistic effect of the posture stabilization of the knob 30 by the stabilizers 55 and the elastic deformation of the first transmitting member 36, the first transmitting member 36 can be brought into surface contact with the display panel 1. Therefore, the operation transmissibility of the operation knob apparatus 10 can be improved reliably, and hence, the detecting performance of the display panel 1 can be improved, reliably.

The stabilizers 55 include the first stabilizer 55A and the second stabilizer 55B that include their main bodies 55a extending in the X direction (first direction), and disposed in such a manner that the first ends 55a1 thereof are shifted in a direction separating from each other in the X direction. Therefore, the first end 55a1 of the first stabilizer 55A and the first end 55a1 of the second stabilizer 55B can be disposed near the outer circumference of the knob 30. As a result, the distance by which the pair of stabilizers 55A and 55b can support the knob 30 becomes longer as compared with a configuration in which the ends of the paired stabilizers 55 are matched. As a result, tilting of the knob 30 with respect to the rotor 25 can be suppressed across a wider area.

The holding portions 30g include the first holding portions 30g1 configured to hold the respective ends of the first stabilizer 55A, respectively, and the second holding portion 30g2 configured to hold the ends of the second stabilizer 55B, respectively, and the distance D1 between the first portions 30g1-1 and 30g2-1 is longer than the distance L1 between the first portion 30g1-1 and the second portion 30g1-2. Thus, the portions supporting the stabilizers 55A and 55b can be disposed near the outer circumference of the knob 30. As a result, the distance by which the pair of the stabilizers 55A and 55B are held becomes extended, as compared with a configuration in which the holding portions 30g are disposed in an aligned manner. As a result, tilting of the knob 30 with respect to the rotor 25 can be suppressed across a wider area.

The stabilizers 55 include the third stabilizer 55C and the fourth stabilizer 55D both of which include their main bodies 55a extending in the Y direction (second direction), and disposed in such a manner that the first ends 55a1 thereof are shifted in a direction separating from each other in the Y direction. Therefore, the first ends 55a1 of the stabilizers 55C and 55D can be disposed near the outer circumference of the knob 30. As a result, tilting of the knob 30 with respect to the rotor 25 can be suppressed more reliably.

The holding portions 30g include the third holding portions 30g3 configured to hold the ends of the third stabilizer 55C, respectively, and the fourth holding portion 30g4 configured to hold the ends of the fourth stabilizer 55D, respectively, and the distance D2 between the first portions 30g3-1 and 30g4-1 is longer than the distance L2 between the first portion 30g4-1 and the second portion 30g4-2. Thus, the portions supporting the stabilizers 55C and 55D can be disposed near the outer circumference of the knob 30. As a result, tilting of the knob 30 with respect to the rotor 25 can be suppressed across a wider area.

Among the stabilizers 55A to 55B, the first end 55a1 of one stabilizer 55 and the second end 55a2 of another stabilizer 55 adjacent thereto are disposed adjacently to (shifted with respect to) each other in the X direction or the Y direction. In this manner, because the first ends 55a1 of the stabilizers 55 can be disposed near the outer circumference of the knob 30 reliably, tilting of the knob 30 with respect to the rotor 25 can be suppressed effectively.

All of the stabilizers 55A to 55D have the same shape. Therefore, not only because there is no risk of attaching erroneously, workability in assembly can be improved, but also the stability of the posture of the knob 30 can be improved reliably.

The rotor 25 is an annular body having an opening 26, and the knob 30 is an annular body having the inner wall 30a positioned inside the opening 25 and the outer wall 30b surrounding the rotor 25. Therefore, a part of the display panel 1 can be visually recognized through the space on the inner side of the rotor 25 and the knob 30, so that the display area of the display panel 1 can be ensured.

The base includes the rotor 25 having the first surface 25a and the second surface 25b, and the annular holder 20 configured to hold the rotor 25 rotatably, and, on the first surface 25a of the rotor 25, the second transmitting member 37 is provided. Therefore, because not only the pressing operation of the knob 30 but also the rotating operation of the knob 30 can be transmitted to the display panel 1, but also because the display panel 1 can detect the rotating operation, convenience can be improved.

Because the first transmitting member 36 and the second transmitting member 37 are disposed locally between the inner wall 30a and the outer wall 30b of the knob 30 the size of the operation knob apparatus 10 can be kept small.

The operation knob apparatus 10 according to the present invention is not limited to the configuration disclosed above in the embodiment, and various modifications thereof are still possible.

Figure 13:
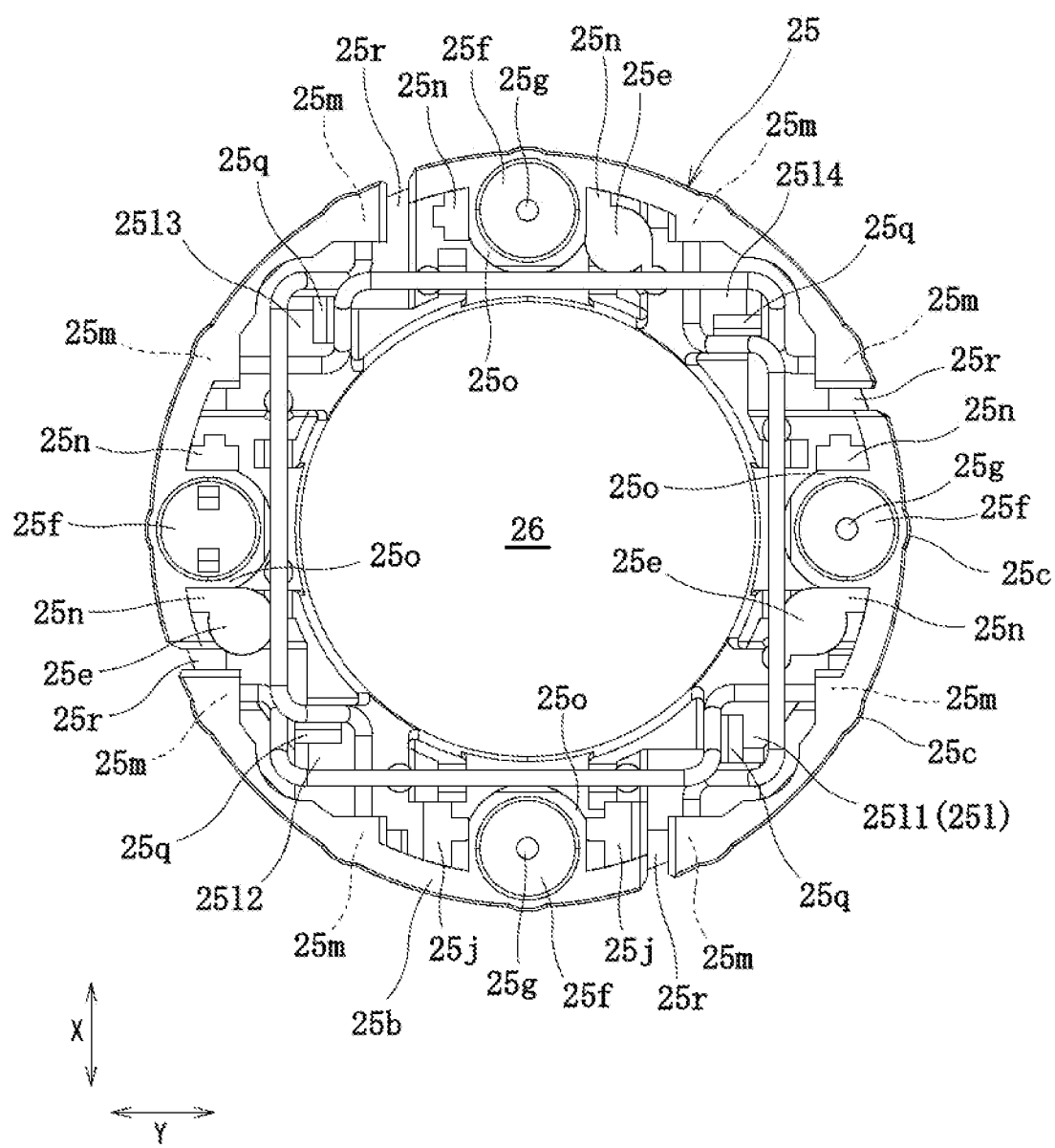
FIG. 13 is a front view illustrating a modification of the rotor.

For example, as illustrated in FIG. 13, in the rotor 25, the communicating grooves 25r may be provided to all of the holding grooves 25m where the first base portions 55c are disposed, respectively. In this manner, it is possible to dispose all of the stabilizers 55A to 55D by sliding, and to remove the restriction in the order in which the stabilizers 55A to 55D are assembled. In this manner, the workability in the assembly can be improved.

Figure 14:
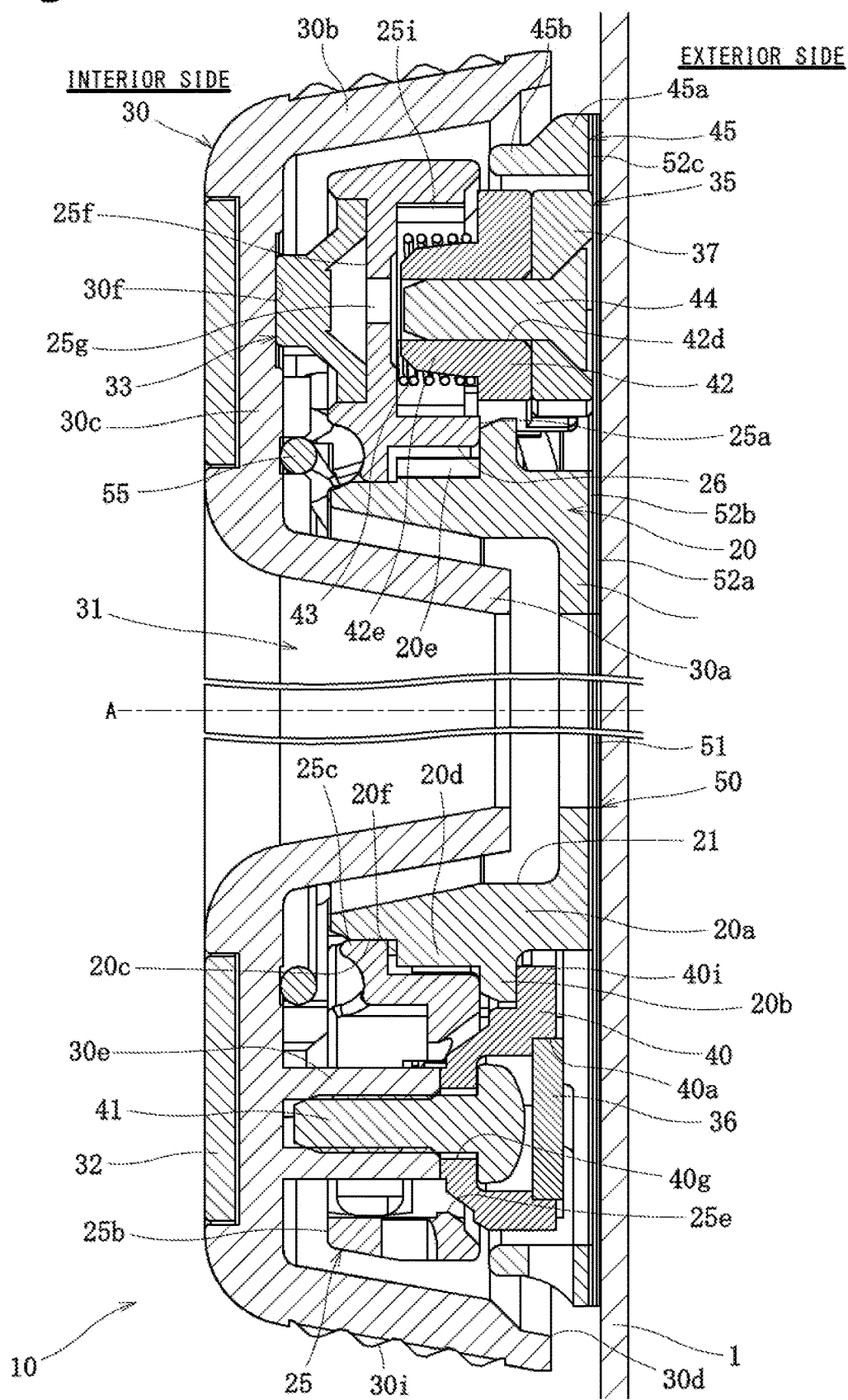
FIG. 14 is a cross-sectional view illustrating a modification of the operation knob apparatus.

As illustrated in FIG. 14, the holder 20 may also be disposed on the inner circumferential side of the rotor 25, and the ring member 45 may be disposed on the outer circumferential side of the rotor 25. In such an example, as compared with the example in which the rotor 25 is disposed inside the holder 20, any liquid having unintentionally gotten inside can be easily discharged to the outside. Therefore, it is possible to prevent any liquid from remaining inside, and it is possible to prevent the conductivity of the transmitting members 36 and 37 from becoming impaired.

Specifically, because the holder 20 holds the rotor 25 having the knob 30, the first transmitting member 36, and the second transmitting member 37 attached thereto, the size thereof in the axial direction becomes inevitably large. When such a holder is positioned at the outer circumferential side, the holder becomes a barrier and prevents liquid from going outside by its own weight. By contrast, in the modification illustrated FIG. 14, because the holder 20 is positioned on the inner circumferential side, the holder 20 does not prevent any liquid from going out by its own weight. Therefore, liquid drainability can be improved. In addition, by providing a through-hole 60 on the lower end of the ring member 45, liquid dischargeability can be further improved.

Moreover, because the rotor 25 is disposed on the outer side the holder 20, the degree of freedom in design is increased, and it becomes possible to form a rotor 25 having a larger radial size. In such an example, the stabilizers 55 and the biasing member 33 for ensuring the operability can also be increased in size, and the stabilizers 55 can be disposed on the outer side as far as possible, so that tilting of the knob 30 in a planer direction can be further suppressed during a pressing operation. Therefore, the operability and the operation stability of the knob 30 can be improved.

The number of the stabilizers 55 is not limited to four, and may be only two opposing stabilizers or particularly only one, or changed as necessary.

The operation knob apparatus 10 is not limited to the annular shape, and may have a circular shape without an opening in a view from the direction in which the axis A extends. The outer shape of the operation knob apparatus 10 may also be polygonal.

The operation knob apparatus 10 according to the present invention can be used in any product other than an in-vehicle product, as long as the product is one on which a display panel 1 including a touch detection function is mounted.

The invention claimed is:

1. An operation knob apparatus comprising:
a base having a first surface facing a display panel and a second surface positioned on an opposite side of the display panel with respect to the first surface;
a conductive transmitting member on the first surface of the base;
an operation member on the second surface of the base so as to be movable relative to the base in a direction intersecting with the first surface, and configured to bring the transmitting member near to and away from the display panel; and
a first stabilizer and a second stabilizer between the base and the operation member, each of the first stabilizer and the second stabilizer including:
a main body extending in a first direction along the second surface of the base,
a pair of arms that are connected to respective ends of the main body, and both of the pair of arms protruding in a same direction from the main body, and
a pair of base portions respectively connected to the pair of arms, the base portions protruding in directions separating from the arms,
wherein the first stabilizer and the second stabilizer are arranged with a space therebetween in a second direction intersecting with the first direction,
wherein one of the base and the operation member includes a holding portion configured to rotatably hold the main body, wherein the other of the base and the operation member has a pair of holding grooves configured to hold the base portions slidably along the second surface and rotatably, wherein the main body of the first stabilizer has a first end positioned on one side in the first direction and a second end positioned in another side of the first direction, and wherein the main body of the second stabilizer has a first end positioned on the other side in the first direction with respect to the second end of the first stabilizer, and a second end positioned between the first end and the second end of the first stabilizer.

2. The operation knob apparatus according to claim 1, wherein the holding portion comprises a first holding portion configured to hold the first stabilizer, the operation knob apparatus further comprising a second holding portion configured to hold the second stabilizer, wherein the first holding portion includes a first portion configured to hold the first end of the first stabilizer and a second portion configured to hold the second end of the first stabilizer, wherein the second holding portion includes a first portion configured to hold the first end of the second stabilizer and a second portion configured to hold the second end of the second stabilizer, and wherein a distance in the first direction from the first portion of the first holding portion to the first portion of the second holding portion is longer than a distance from the first portion to the second portion of the first holding portion and a distance from the first portion to the second portion of the second holding portion.

3. The operation knob apparatus according to claim 1, further comprising a third stabilizer and a fourth stabilizer each having a respective main body extending in the second direction and arranged to have a space therebetween in the first direction, wherein the main body of the third stabilizer has a first end positioned near the second stabilizer and a second end positioned near the first stabilizer, and wherein the main body of the fourth stabilizer has a first end positioned nearer to the first stabilizer, than the second end of the third stabilizer is, and a second end positioned between the first end and the second end of the third stabilizer.

4. The operation knob apparatus according to claim 3, wherein the holding portion comprises a first holding portion configured to hold the first stabilizer, the operation knob apparatus further comprising a second holding portion configured to hold the second stabilizer, a third holding portion configured to hold the third stabilizer, and a fourth holding portion configured to hold the fourth stabilizer, wherein the third holding portion includes a first portion configured to hold the first end of the third stabilizer and a second portion configured to hold the second end of the third stabilizer, wherein the fourth holding portion includes a first portion configured to hold the first end of the fourth stabilizer and a second portion configured to hold the second end of the fourth stabilizer, and wherein a distance in the second direction from the first portion of the third holding portion to the first portion of the fourth holding portion is longer than a distance from the first portion to the second portion of the third holding portion and a distance from the first portion to the second portion of the fourth holding portion.

5. The operation knob apparatus according to claim 3, wherein the third stabilizer is disposed on the one side in the first direction, and the fourth stabilizer is disposed on the other side in the first direction, wherein the first end of the first stabilizer and the second end of the third stabilizer are adjacent to each other with a space therebetween in the second direction, wherein the first end of the third stabilizer and the second end of the second stabilizer are adjacent to each other with a space therebetween in the first direction, wherein the first end of the second stabilizer and the second end of the fourth stabilizer are adjacent to each other with a space therebetween in the second direction, and wherein the first end of the fourth stabilizer and the second end of the first stabilizer are adjacent to each other with a space therebetween in the first direction.

6. The operation knob apparatus according to claim 3, wherein all of the first stabilizer, the second stabilizer, the third stabilizer, and the fourth stabilizer have a same shape.

7. The operation knob apparatus according to claim 1, wherein the base is an annular body having an opening, and wherein the operation member is an annular body including a cylindrical inner wall positioned on an inner side of the opening and a cylindrical outer wall surrounding an outer circumference of the base.

8. The operation knob apparatus according to claim 1, wherein the base includes a rotor having the first surface and the second surface, and an annular holder configured to rotatably hold the rotor, and wherein a second transmitting member different from the transmitting member is provided on the first surface of the rotor in a manner rotating integrally with the rotor.

* * * * *